US010972728B2

United States Patent
He et al.

(10) Patent No.: US 10,972,728 B2
(45) Date of Patent: Apr. 6, 2021

(54) CHROMA ENHANCEMENT FILTERING FOR HIGH DYNAMIC RANGE VIDEO CODING

(71) Applicant: InterDigital Madison Patent Holdings, SAS, Paris (FR)

(72) Inventors: Yuwen He, San Diego, CA (US); Yan Ye, San Diego, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 15/567,340

(22) PCT Filed: Apr. 15, 2016

(86) PCT No.: PCT/US2016/027657
§ 371 (c)(1),
(2) Date: Oct. 17, 2017

(87) PCT Pub. No.: WO2016/168529
PCT Pub. Date: Oct. 20, 2016

(65) Prior Publication Data
US 2018/0124400 A1 May 3, 2018

Related U.S. Application Data

(60) Provisional application No. 62/149,494, filed on Apr. 17, 2015.

(51) Int. Cl.
*H04N 19/136* (2014.01)
*H04N 19/186* (2014.01)
(Continued)

(52) U.S. Cl.
CPC ......... *H04N 19/117* (2014.11); *H04N 19/136* (2014.11); *H04N 19/186* (2014.11); *H04N 19/46* (2014.11); *H04N 19/86* (2014.11)

(58) Field of Classification Search
CPC .................................................. H04N 19/117
(Continued)

(56) References Cited

U.S. PATENT DOCUMENTS 4,701,783 A 10/1987 Glenn et al.
7,551,232 B2 6/2009 Winger et al.
(Continued)

FOREIGN PATENT DOCUMENTS

CN 101009770 A 8/2007
CN 101009842 A 8/2007
(Continued)

OTHER PUBLICATIONS

Bordes et al., "AHG14: Color Gamut Scalable Video Coding using 3D LUT", Technicolor, JCTVC-M0197, 13th Meeting: Incheon, KR, Apr. 18-26, 2013, 10 pages.
(Continued)

*Primary Examiner* — Amir Shahnami
(74) *Attorney, Agent, or Firm* — Condo Roccia Koptiw LLP

(57) ABSTRACT

Chroma enhancement filtering may be used in high dynamic range (HDR) video. A video coding device may identify a characteristic within a picture of a video signal. The characteristic may include a spatial region, a color, a luminance, or an edge direction. The video coding device may determine a sample set that includes one or more samples associated with the characteristic. The video coding device may generate a cross-plane filter based on the characteristic and the sample set. The cross-plane filter may include a high pass filter. The video coding device may apply the cross-plane filter to a luma plane component of a sample in the sample set to determine an offset. The video coding device may add the offset to a reconstructed chroma plane component of the sample that corresponds to the luma plane component.

20 Claims, 18 Drawing Sheets

(51) Int. Cl.
    *H04N 19/46*     (2014.01)
    *H04N 19/117*    (2014.01)
    *H04N 19/86*     (2014.01)

(58) Field of Classification Search
    USPC .................................................. 375/240.29
    See application file for complete search history.

(56) References Cited

U.S. PATENT DOCUMENTS

| | | | |
|---|---|---|---|
| 7,720,156 B2 | 5/2010 | Kim et al. | |
| 7,778,459 B2 | 8/2010 | Song | |
| 8,467,459 B2 | 6/2013 | Yin et al. | |
| 9,503,733 B2 | 11/2016 | Minoo et al. | |
| 9,807,403 B2 | 10/2017 | Chong et al. | |
| 2003/0184659 A1 | 10/2003 | Skow | |
| 2005/0013370 A1 | 1/2005 | Kim | |
| 2005/0168650 A1 | 8/2005 | Walls et al. | |
| 2006/0268177 A1 | 11/2006 | Chang | |
| 2007/0109448 A1* | 5/2007 | Winger | H04N 5/21 348/624 |
| 2008/0043840 A1 | 2/2008 | Song | |
| 2009/0129465 A1 | 5/2009 | Lai et al. | |
| 2010/0086026 A1 | 4/2010 | Paniconi et al. | |
| 2011/0150080 A1 | 6/2011 | Watanabe et al. | |
| 2012/0008687 A1 | 1/2012 | Haskell | |
| 2014/0086316 A1 | 3/2014 | Kerofsky et al. | |
| 2014/0092999 A1* | 4/2014 | Dong | H04N 19/70 375/240.29 |
| 2014/0185680 A1 | 7/2014 | Li et al. | |
| 2014/0307773 A1* | 10/2014 | Minoo | H04N 19/70 375/240.02 |
| 2014/0334559 A1 | 11/2014 | Kim et al. | |
| 2014/0369426 A1* | 12/2014 | Li | H04N 19/30 375/240.29 |
| 2015/0036744 A1 | 2/2015 | Sato | |

FOREIGN PATENT DOCUMENTS

| | | |
|---|---|---|
| CN | 101902653 A | 12/2010 |
| CN | 201726499 U | 1/2011 |
| CN | 10389129 A | 6/2014 |
| CN | 103891293 A | 6/2014 |
| EP | 1509045 A2 | 2/2005 |
| KR | 10-2010-0038164 A | 4/2010 |
| WO | WO 2006/108654 A2 | 10/2006 |
| WO | WO 2008/020687 A1 | 2/2008 |
| WO | WO 2010/001999 A1 | 1/2010 |
| WO | WO 2013/164922 A1 | 11/2013 |
| WO | 2014/052731 A2 | 4/2014 |
| WO | WO 2016/172314 A1 | 10/2016 |

OTHER PUBLICATIONS

Boyce et al., "Draft High Efficiency Video Coding (HEVC) Version 2, Combined Format Range Extensions (RExt), Scalability (SHVC), and Multi-View (MV-HEVC) Extensions", JCTVC-R1013, Jun. 30-Jul. 9, 2014, 382 pages.

Dong et al., "Cross-Plane Chroma Enhancement for SHVC Inter-Layer Prediction", IEEE, 2013 Picture Coding Symposium (PCS), Dec. 2013, 4 pages.

Ebrahimi et al., "Description of Subjective Evaluation for Evidence (CfE) for HDR and WCG Video Coding", M35481, Geneva, Switzerland, Feb. 2015, 3 pages.

EXR, "OpenEXR", Available at http://www.openexr.com/, retrieved on Oct. 9, 2017, 9 pages.

Ferwerda, J. A., "Elements of Early Vision for Computer Graphics", IEEE Computer Graphics and Applications, vol. 21, No. 5, Sep./Oct. 2001, pp. 22-33.

Fogg et al., "Output Code Map SEI", Motion Picture Laboratories Inc., JCTVC-T0102, 20th Meeting: Geneva, CH, Feb. 10-18, 2015, 4 pages.

François et al., "Interim Report on the Anchors Generation in View of the CFE for HDR/WCG Video Coding", M35467, Geneva, Switzerland, Feb. 2015, 6 pages.

Goris et al., "Parameter Based Compatible HDR Proposal", M35067, Strasbourg, France, Oct. 2014, 4 pages.

ISO/IEC, "Information technology—Coding of Audio-Visual Objects—Part 2: Visual", Reference number: ISO/IEC 14496-2:2001(E), Dec. 1, 2001, 536 pages.

ISO/IEC, "Information Technology—Coding of Moving Pictures and Associated Audio for Digital Storage Media at up to about 1,5 Mbit/s—Part 2: Video", Ref. No. ISO/IEC 11172-2:1993/Cor. 3:2003(E), Nov. 1, 2003, 6 pages.

ITU, "Codec for Audiovisual Services AT n×384 kbit/s", Reedition of CCITT Recommendation H.261 published in the Blue Book, Fascicle III.6, Nov. 1988, 14 pages.

ITU-R, "Parameter Values for the HDTV Standards for Production and International Programme Exchange", Recommendation ITU-R BT.709-6, Jun. 2015, 19 pages.

ITU-R, "Parameter Values for UHDTV Systems for Production and International Programme Exchange", ITU-R Recommendation BT.2020, Oct. 2012, 8 pages.

ITU-R, "Reference Electro-Optical Transfer Function for Flat Panel Displays Used in HDTV Studio Production", Recommendation ITU-R BT.1886, BT Series, Broadcasting Service (Television), Mar. 2011, 7 pages.

ITU-T, "Advanced Video Coding for Generic Audiovisual Services", ITU-T Recommendation H.264, Nov. 2007, 564 pages.

ITU-T, "Transmission of Non-Telephone Signals—Video Coding for Low Bit Rate Communication ITU-T", ITU-T Recommendation H.263, Mar. 1996, 52 pages.

Laksono, Indra, "Hardware Implementation of HDR Video Decoding and Display System", M36162, Geneva, Switzerland, Feb. 2015, 6 pages.

Leannec et al., "Modulation Channel Information SEI Message", M33776, Sapporo, JP, Jul. 2014, 13 pages.

Luthra et al., "Call for 1000 and 4000 Nits Peak Brightness Test Material for HDR and WCG Video Coding", ISO/IEC JTC1/SC29/WG11 MPEG2014/N15099, Geneva, Switzerland, Feb. 2015, 2 pages.

Luthra et al., "Call for Evidence (CfE) for HDR and WCG Video Coding", ISO/IEC JTC1/SC29/WG11, Doc. N15083, Geneva, Switzerland, Feb. 2015, 46 pages.

Luthra et al., "Requirements and Use Cases for HDR and WCG Content Coding", ISO/IEC JTC1/SC29/WG11 MPEG2014/N15084, Geneva, Switzerland, Feb. 2015, 13 pages.

Luthra et al., "Use Cases of the Scalable Enhancement of HEVC", ISO/IEC JTC1/SC29/WG11 N12955, Jul. 2012, Stockholm, Sweden, 8 pages.

Mantiuk et al., "HDR-VDP-2: A Calibrated Visual Metric for Visibility and Quality Predictions in all Luminance Conditions", ACM Transactions on Graphics (TOG)—Proceedings of ACM SIGGRAPH 2011, vol. 30, No. 4, Jul. 2011, 13 pages.

Sharma et al., "The CIEDE2000 Color-Difference Formula: Implementation Notes, Supplementary Test Data, and Mathematical Observations", Color Research & Applications (Wiley Interscience), vol. 30, No. 1, Feb. 2005, pp. 21-30.

Sheikh et al., "Image Information and Visual Quality", IEEE Transactions on Image Processing, vol. 15, No. 2, Feb. 2006, pp. 430-444.

Smolic, A., "Informative Input on Temporally Coherent Local Tone Mapping of HDR Video", M35479, Geneva, Switzerland, Feb. 2015.

Smpte, "High Dynamic Range Electro-Optical Transfer Function of Mastering Reference Displays", Aug. 29, 2014, pp. 1-14—14 pages.

Smpte, "Mastering Display Color Volume Metadata Supporting High Luminance and Wide Color Gamut Images", ST 2086:2014, Oct. 30, 2014, pp. 1-6.

Stessen et al., "Chromaticity Based Color Signals", M34335, Sapporo, Japan, Jul. 2014, 16 pages.

Sullivan et al., "Standardized Extensions of High Efficiency Video Coding (HEVC)", IEEE Journal of Selected Topics in Signal Processing, vol. 7, No. 6, Dec. 2013, pp. 1001-1016.

(56) References Cited

OTHER PUBLICATIONS

Tourapis et al., "Exploration Experiment 3 on Objective Test Methods for HDR and WCG Video Coding Evaluation", M35478, Geneva, Switzerland, Feb. 2015, 5 pages.

Tourapis et al., "HDRTools: Software Updates", ISO/IEC JTC1/SC29/WG11, Doc. M35471, Geneva, Switzerland, Feb. 2015, 2 pages.

Wikipedia, "Half-Precision Floating-Point Format", Available online at http://en.wikipedia.org/wiki/Half-precision_floating-point_format, retrieved on Oct. 12, 2017, 5 pages.

Cho et al, "Color Transient Improvement with Transient Detection and Variable Length Nonlinear Filtering", IEEE Transactions on Consumer Electronics, vol. 54, No. 4, Nov. 2008, pp. 1873-1879.

Dong et al., "Chroma Enhancement for ILR Picture", InterDigital Communications, LLC, JCTVC-L0059, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, pp. 1-6.

Dong et al., "Cross-Plane Chroma Enhancement for SHVC Inter-Layer Prediction", IEEE, 2013 Picture Coding Symposium (PCS), Dec. 2013, pp. 309-312.

Kim et al., "New Intra Chroma Prediction Using Inter-Channel Correlation", JCTVC-B021, Joint Collaborative Team on Video Coding (JCT-VC) of ITU-T SG16 WP3 and ISO/IEC JTC/SC29/WG11, 2nd Meeting, Geneva, CH, Jul. 21-28, 2010, 9 pages.

Lee et al., "Intra Prediction Method Based on the Linear Relationship Between the Channels for YUV 4:2:0 Intra Coding", 16th IEEE International Conference on Image Processing (ICIP), Nov. 7-10, 2009, 4 pages.

Li et al., "Non-SCE3: Region Based Inter-Layer Cross-Color Filtering", Qualcomm Incorporated, Samsung Electronics, Ltd., JCTVC-N0229, Joint Collaborative Team on Video Coding (JCT-VC) of ITU-T SG 16 WP 3 and ISO/IEC JTC 1/SC 29/WG 11, 14th Meeting: Vienna, AT, Jul. 25-Aug. 2, 2013, pp. 1-12.

Bross et al., "High efficiency video coding (HEVC) text specification draft 8", JCTVC-J1003, 10th Meeting: Stockholm, SE, Jul. 11-20, 2012, 294 pages.

ISO/IEC, "Joint Call for Proposals on Scalable Video Coding Extensions of High Efficiency Video Coding (HEVC)", ISO/IEC JTC 1/SC 29/WG 11 and ITU-T SG 16 WP 3, ISO/IEC JTC1/SC29/WG11 N12957, Stockholm, Sweden, Jul. 2012, 11 pages.

ITU-R, "Studio Encoding Parameters of Digital Television for Standard 4:3 and Wide-Screen 16:9 Aspect Ratios", Recommendation ITU-R BT.601-5, Section 11B: Digital Television, 1998, pp. 1-16.

ITU-T, "Advanced Video Coding for Generic Audiovisual Services", ITU-T Recommendation H.264, Nov. 2007, 563 pages.

Tourapis, "H.264/14496-10 AVC Reference Software Manual" JM reference software JM16.1, Document Available at: http://iphone.hhi.de/suehring/tml/download/jm16.1.zip, Sep. 2009.

Luthra, "Requirements of the Scalable Enhancement of HEVC", WG11 Requirements and Video, N12956, Stockholm, Sweden, Jul. 2012, 12 pages.

Luthra, Ajay, "Use Cases for the Scalable Enhancement of HEVC", ISO/IEC JTC-1/SC29/WG11 M24483, Apr. 2012.

SMPTE, "VC-1 Compressed Video Bitstream Format and Decoding Process-Amendment 2", Amendment 2:2011 to SMPTE ST 421M:2006, Apr. 2006, pp. 1-5.

Sullivan et al., "Rate-Distortion Optimization for Video Compression", Signal Processing Magazine, IEEE, vol. 15, No. 6, Nov. 1998, pp. 74-90.

Li, Xiang et al., "Non-SCE4: Simplification of chroma enhancement for inter layer.reference picture generation", Joint Collaborative Team on Video Coding (JCT-VC) of ITU-T SG 16 WP 3 and ISO/IEC JTC 1/SC 29/WG 11, JCTVC-M0253, Apr. 18-26, 2013, 4 pages.

ITU-T, "Video Coding for Low Bit Rate Communication", H.263, Series H: Audiovisual and Multimedia Systems, Infrastructure of Audiovisual Services—Coding of Moving Video, Jan. 2005, 226 pages.

Lainema et al., "Intra Coding of the HEVC Standard", IEEE Transactions on Circuits and Systems for Video Technology, vol. 22, No. 12, Dec. 2012, pp. 1792-1801.

McCann et al., "High Efficiency Video Coding (HEVC) Test Model 16 (HM 16) Improved Encoder Description", JCTVC-S1002, Joint Collaborative Team on Video Coding (JCT-VC) of ITU-T SG16 WP3 and ISO/IEC JTC1/SC29/WG11, 19th Meeting: Strasbourg, FR, Oct. 17-24, 2014, 54 pages.

Yin et al., "Candidate Test Model for HDR Extension of HEVC", Dolby Laboratories Inc. and InterDigital Communications, LLC, ISO/IEC JTC1/SC29/WG11 MPEG2014/ m37269, Geneva, CH, Oct. 2015, 6 pages.

Yeo et al., "Mode-Dependent Fast Separable KLT for Block-based Intra Coding", JCTVC-B024, Institute for Infocomm Research, Joint Collaborative Team on Video Coding (JCT-VC) of ITU-T SG16 WP3 and ISO/IEC JTC1/SC29/WG11, 2nd Meeting: Geneva, CH, Jul. 21-28, 2010, pp. 1-7.

* cited by examiner

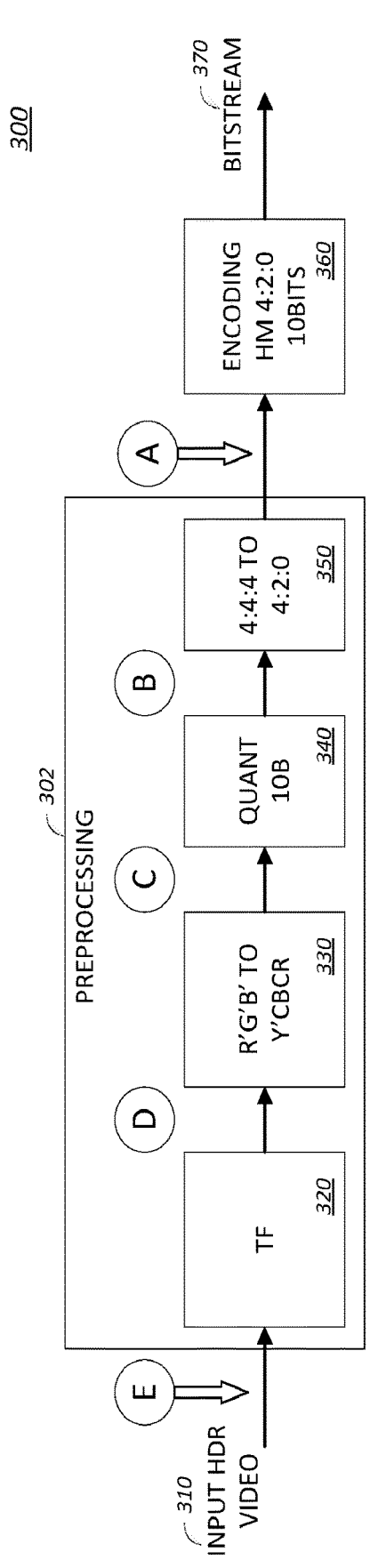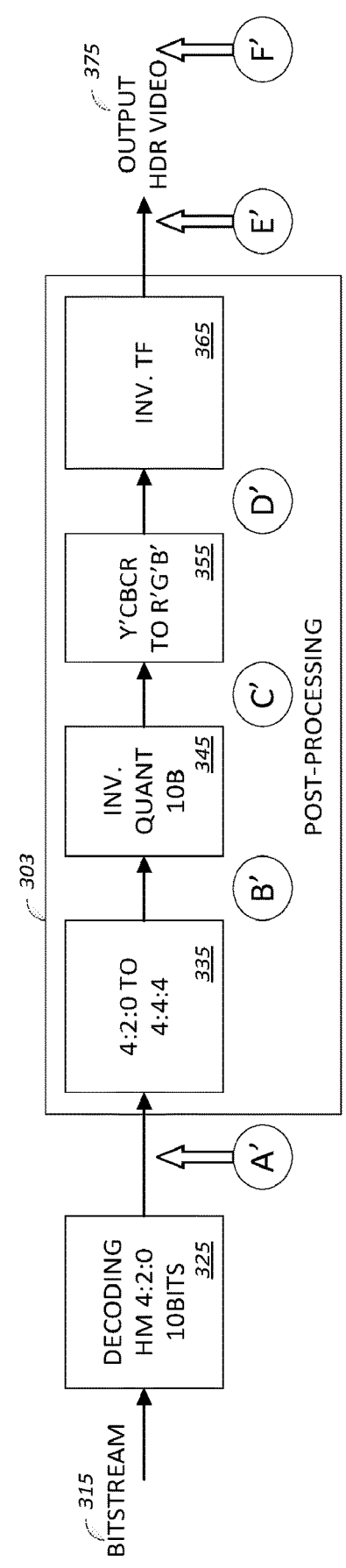
FIG. 3A
FIG. 3B

CHROMA ENHANCEMENT FILTERING FOR HIGH DYNAMIC RANGE VIDEO CODING

CROSS REFERENCE TO RELATED APPLICATIONS

This application is the National Stage Entry under 35 U.S.C. § 371 of Patent Cooperation Treaty Application No. PCT/US2016/027657, filed 15 Apr. 2016, which claims the benefit of U.S. Provisional Application Ser. No. 62/149,494, filed 17 Apr. 2015, the disclosures of which are incorporated herein by references in their entirety.

BACKGROUND

Video coding systems may be used to compress digital video signals. For example, video coding systems may reduce storage space consumed and/or reduce transmission bandwidth consumption associated with video signals. For example, block-based hybrid video coding systems may be used.

Digital video signals may include three color planes. The three color planes may include a luma plane, a blue-difference chroma plane, and a red-difference chroma plane. Pixels of the chroma planes may have smaller dynamic ranges than pixels of the luma plane. For example, the chroma planes of a video image may be smoother and/or have less detail than the luma plane of the video image. A chroma block of a video image may be easier to predict (e.g., accurately predict). For example, prediction of the chroma block may consume fewer resources and/or result in less prediction error.

A high dynamic range (HDR) video may offer a wider dynamic range than a standard dynamic range (SDR) video. The dynamic range of HDR video may be closer to the capacities of the human eye. Chroma artifacts in HDR video may be more visible against a brighter background than chroma artifacts in SDR video. HDR video coding may include preprocessing, coding, decoding, and/or post-processing.

SUMMARY

Systems, methods, and instrumentalities may be provided to implement chroma enhancement filtering for HDR video coding. A video coding device may identify a characteristic within a picture of a video signal. The video coding device may identify the characteristic based on a received indication that identifies the characteristic. The characteristic may include a spatial region, a color, a luminance, or an edge direction. The video coding device may identify a plurality of characteristics within the picture. The video coding device may determine a sample set that includes one or more samples associated with the characteristic. For example, when the characteristic includes a spatial region, the sample set may include the samples within the spatial region of the picture. As another example, when the characteristic includes a color, the sample set may include the samples within the picture that match the color (e.g., within a predetermined color range). As another example, when the characteristic includes a luminance, the sample set may include the samples within the picture having a luminance value within a predetermined luminance range. As another example, when the characteristic includes an edge direction, the sample set may include the samples within the picture having a dominant edge direction that matches the edge direction. The sample set may be determined based on the plurality of characteristics.

The video coding device may generate a cross-plane filter based on the characteristic and the sample set. The cross-plane filter may include a high pass filter. The video coding device may generate the cross-plane filter based on a receipt of one or more cross-plane filter parameters via a supplemental enhancement information (SEI) message. The video coding device may apply the cross-plane filter to a luma plane component of a sample in the sample set to determine an offset. The video coding device may add the offset to a reconstructed chroma plane component of the sample that corresponds to the luma plane component. The luma plane component and the reconstructed chroma plane component may have different spatial dimensions. The luma plane component and the reconstructed chroma plane component may have the same spatial dimensions. The reconstructed chroma plane component may be a first reconstructed chroma plane component. The video coding device may add the offset to a second reconstructed chroma plane component of the sample. The video coding device may apply the cross-plane filter to the luma plane component of each of the one or more samples in the sample set.

A cross-plane filter may be generated for a sample set. The cross-plane filter may include one or more high pass filters. One or more cross-plane filter parameters may be determined. The one or more cross-plane filter parameters may be associated with the cross-plane filter. The one or more cross-plane filter parameters may be encoded into a bitstream associated with a video signal. The one or more cross-plane filter parameters may include one or more of a scaling factor, one or more cross-plane filter coefficients, a shifting parameter, a chroma enhancement indication, or a chroma component indication. The chroma enhancement indication may indicate whether to apply the cross-plane filter to a chroma component.

BRIEF DESCRIPTION OF THE DRAWINGS

FIG. 3A is a flow diagram illustrating an example HDR coding process.

FIG. 3B is a flow diagram illustrating an example HDR decoding process,

DETAILED DESCRIPTION

Figure 1:
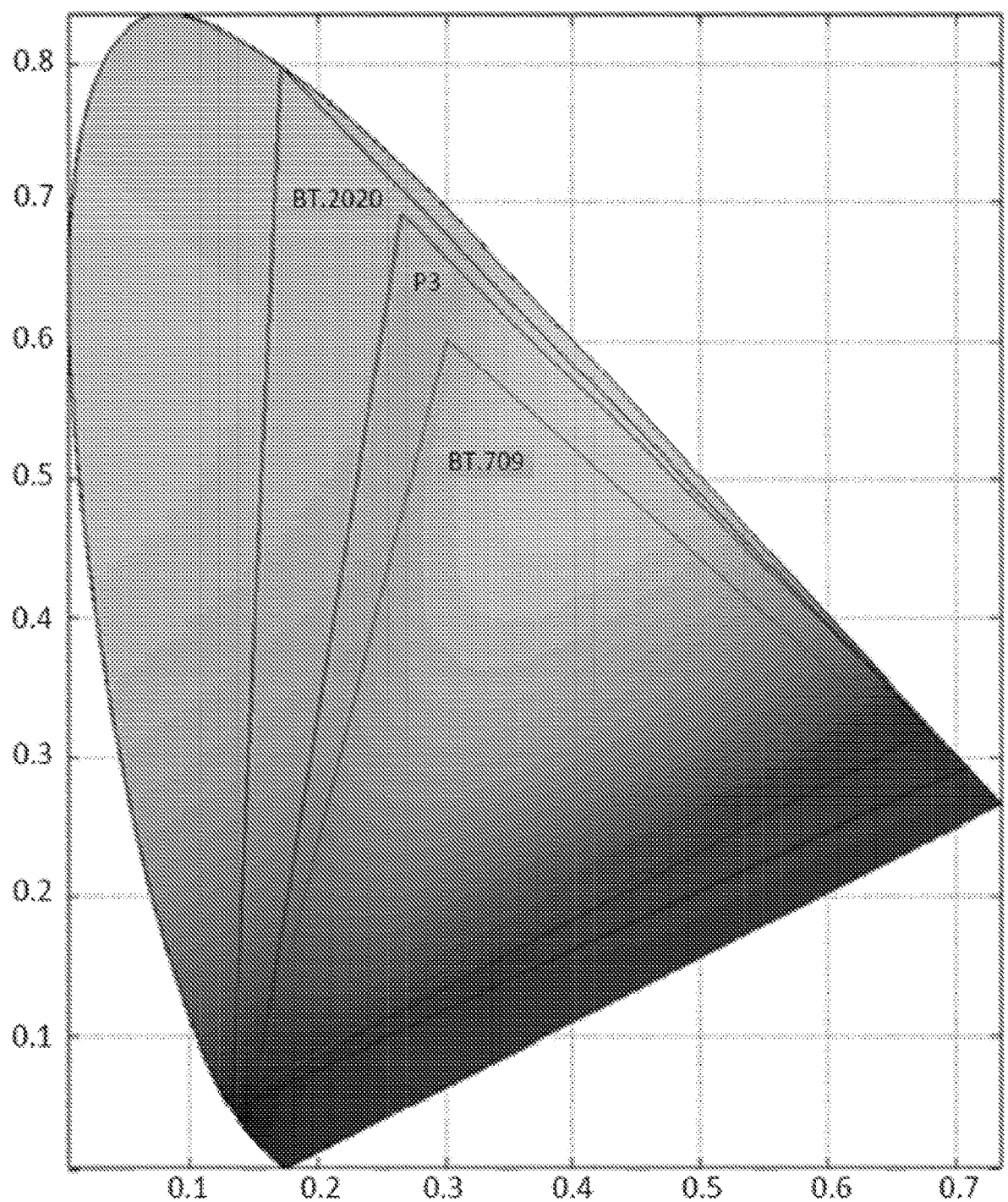
FIG. 1 is a diagram illustrating the BT.709 color gamut used in high definition (HD) TV, the P3 color gamut, and the BT.2020 color gamut used in ultra high definition (UHD) TV overlaid with the CIE 1931 color space chromaticity.

A detailed description of illustrative embodiments will now be described with reference to the various figures. Although this description provides a detailed example of possible implementations, it should be noted that the details are intended to be exemplary and in no way limit the scope of the application.

Various digital video compression technologies have been developed and standardized to enable efficient digital video communication, distribution and consumption. For example, deployed standards such as H.261, MPEG-1, MPEG-2, H.263, MPEG-4 part2 and H.264/MPEG-4 part 10 AVC have been developed by ISO/IEC and/or ITU-T. As another example, a High Efficiency Video Coding (HEVC) standard, has been jointly developed by the ITU-T Video Coding Experts Group (VCEG) and ISO/IEC Moving Picture Experts Group (MPEG).

Digital video services may refer to TV services over satellite, cable and/or terrestrial broadcasting channels, as well as video applications via smart phones, tablets, and/or personal computers (e.g., video chat, mobile video recording and sharing, and/or video streaming). A video application may send or receive videos in heterogeneous environments. For example, the scenarios known as 3-screen and N-screen that consider various consumer devices (e.g., PCs, smart phones, tablets, TVs) must accommodate video consumption on devices with widely varying capabilities in terms of computing power, memory/storage size, display resolution, display frame rate, display color gamut, and/or the like. The network and/or transmission channels may have varying characteristics in terms of packet loss rate, available channel bandwidth, burst error rate, and/or the like. Video data may be transmitted over a combination of wired networks and wireless networks, which may further complicate the underlying transmission channel characteristics. Scalable video coding may improve the quality of experience for video applications running on devices with different capabilities over heterogeneous networks. Scalable video coding may encode a video signal at a highest representation (e.g., temporal resolution, spatial resolution, quality, etc.). Scalable video encoding may enable decoding from subsets of a video stream (e.g., depending on the specific rate and representation required by certain applications running on specific client device). Scalable video coding may reduce use of backbone network bandwidth and/or storage when compared to non-scalable video coding. The international video standards MPEG-2 Video, H.263, MPEG4 Visual and H.264 include tools and/or profiles that support some modes of scalability.

The ITU-R BT.2020 specification, published by the ITU-R, defines thevideo format for Ultra High Definition TV (UHDTV) applications. As illustrated in Table 1, compared to the High Definition TV (HDTV) video format defined in ITU-R BT.709, UHDTV supports larger spatial resolution (e.g., up to 4K×2K (3840×2160) and 8K×4K (7680×4320) resolutions), higher frame-rate (e.g., up to 120 Hz), higher sample bit depth (e.g., 10 bits or 12 bits), and wider color gamut. The user experience may be improved with the high fidelity video signal that BT.2020 provides.

TABLE 1

|  |  | High Definition | Ultra High Definition |
|---|---|---|---|
| ITU-R BT series | | BT.709-5 (part 2) | BT.2020 |
| Spatial resolution | | 1920 × 1080 | 7680 × 4320, 3840 × 2160 |
| Temporal | Frame rate | 60, 50, 30, 25, 24 | 120, 60, 50, 30, 25, 24 |
| | Scan | Progressive, interlaced | Progressive |
| Primary colors | Red primary | (0.640, 0.300) | (0.708, 0.292) |
| | Green primary | (0.150, 0.330) | (0.170, 0.797) |
| | Blue primary | (0.600, 0.060) | (0.131, 0.046) |
| | White point | (0.3127, 0.3290) (D65) | |
| | Coding format | 8- and 10-bit | 10- and 12-bit |

FIG. 1 is a diagram illustrating the BT.709 color gamut (e.g., the inner triangle), the P3 color gamut (e.g., the intermediate triangle) and the BT.2020 color gamut (e.g., the outer triangle) overlaid with the CIE 1931 color space chromaticity (e.g., the horseshoe shape). The horseshoe shape may represent the range of visible colors (e.g., to the human eye). The BT.709 color gamut and the BT.2020 color gamut may cover about 36% and 76% of the CIE 1931 color space, respectively. When compared to a color volume that can be reproduced on a BT.709 (HD) display, a BT.2020 display may increase the volume of reproduce-able colors and may display more vivid and richer colors to the consumer. The P3 color gamut may be used in digital cinema applications.

The quality of viewing experience in consumer electronics may improve with new video technologies such as, spatial resolution changes from HD to UHD; frame rate changes from 60 Hz to 100/120 Hz, stereoscopic/multi-view is also enhanced; the color gamut is becoming wider from BT.709 to P3/BT.2020; and/or the like.

Dynamic range may be defined as a ratio between the minimum and maximum luminance perceived or captured in a real scene or a rendering device. Dynamic range may be measured in terms of 'f-stop' or 'f-number'. One f-stop may correspond to a doubling of the signal dynamic range. The luminance may be measured in candela (cd) per m$^2$, which may also be referred to as "nits." For example, in natural scenes, the sunlight may have a luminance of $6\times10^8$ nits, the blue sky in the morning may have a luminance of 4600 nits, and the night sky may have a luminance of 0.005 nits or lower. The natural scenes may include a dynamic range around 100 million (e.g., around 27 f-stops). The sky seen through a window may have a luminance around 10,000 nits, a face in a room may have a luminance of 50 nits, and a dark surface in a room may have a luminance of around 1 nit. The human eye (e.g., vision) may adapt in order to capture lights below starlight or above sunlight (e.g., which corresponds to lighting conditions that vary by nearly 10 orders of magnitude). A consumer display may support (e.g., only support) 100 nits peak luminance, which is well below the dynamic range of natural scene that the human eye can perceive. Video distribution environments may provide Standard Dynamic Range (SDR) content, typically supporting a range of brightness of around 0.1 to a few hundred nits, leading to a dynamic range less than 10 f-stops. A High Dynamic Range (HDR) display (e.g., with peak luminance of 1000 to 4000 nits) may provide significant perceptual quality benefits. The HDR and wide color gamut (WCG) may extend the limit of artistic intent expression. Proprietary solutions for HDR/WCG service delivery chain may include capturing, preprocessing, compression, decompression, post-processing and display. A commercially available camera may capture HDR video at a dynamic range of up to 14 f-stops.

Figure 2:
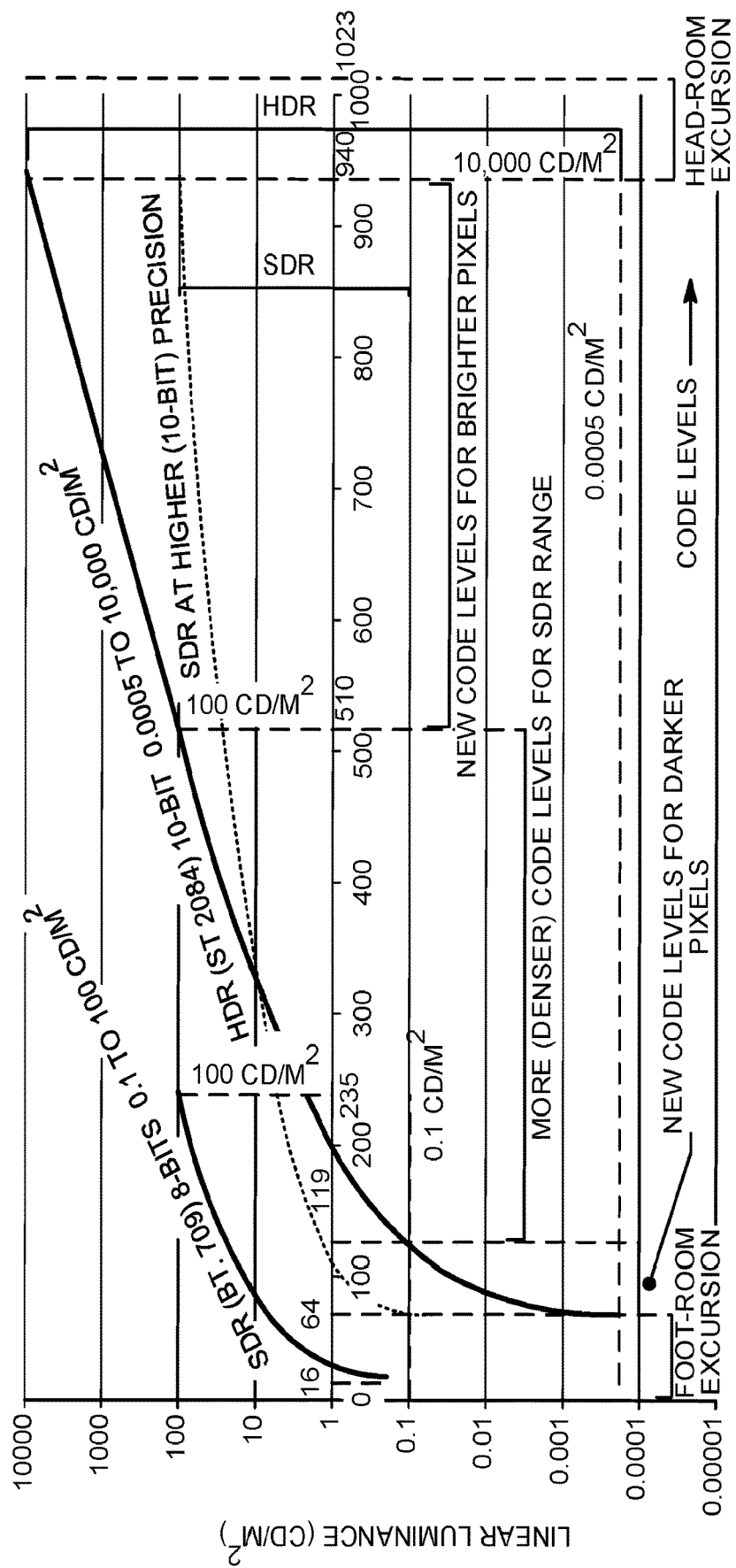
FIG. 2 is a diagram illustrating the mapping between linear light to code level of SDR video and HDR video.

One or more proprietary solutions for HDR/WCG may not inter-operate with other proprietary solutions. Interoperability may be a key factor in video delivery. In the MPEG requirements for HDR and WCG content distribution and storage, a HDR may correspond to more than 16 f-stops. Dynamic ranges in between 10 and 16 f-stops may be considered as Intermediate or Extended dynamic range. The intermediate or extended dynamic range may be smaller (e.g., significantly smaller) than the dynamic range encountered in real life. The intermediate or extended dynamic range may be below the capabilities of the human vision system. HDR video may offer a wider dynamic range that is closer to the capacities of the human eye. Example native test sequences of HDR may cover BT.709, P3 color gamuts and they may be stored in BT.2020 and BT.709 containers, and the file format may be EXR or TIFF. A peak luminance of an HDR sequence may be about 4000 nits. As illustrated in FIG. 2, the transfer function (TF) used to convert a linear signal to a non-linear signal for compression may be a perceptual quantizer (PQ) (e.g., different from the gamma function generally used in SDR coding). The transfer function may be an opto-electrical transfer function (OETF). The objective quality evaluation for HDR compression may be more complex than SDR because HDR compressed video may include many different types of distortions such as color bleeding and/or color banding, in addition to blurring, blocking, ringing and/or flicking artifacts. Artifacts may be more visible against a brighter background. The metrics considered for objective quality evaluation in HDR and WCG may include: PSNR in XYZ with the transfer function referred as tPSNR, PSNR evaluation in linear RGB with gamma being equal to 2.2 referred as mPSNR, PSNR of the mean absolute value of the deltaE2000 metric referred as PSNR_DE2000, Visual Difference Predictor (VDP2), Visual Information Fidelity (VIF), Structural similarity (SSIM), and/or the like. One or more major metrics may be chosen, such as tPSNR, mPSNR and PSNR_DE2000. The subjective quality evaluation procedure for HDR may include a scenario where side by side viewing comparison between cropped video and cropped original video will be carried out, and HDR display will be calibrated (such as peak brightness, display uniformity, etc.).

FIG. 3A is a flow diagram illustrating an example HDR coding process 300. FIG. 3B is a flow diagram illustrating an example HDR coding process 305. The HDR coding process 300, 305 may include preprocessing, encoding, decoding, and/or post-processing. Preprocessing 302 (e.g., HDR preprocessing) may be applied to an HDR video signal input 310. For example, HDR preprocessing 302 may include applying a transfer function (TF) 320, a color space conversion 330, quantization 340, and/or a chroma format conversion 350. The color space conversion 330 may include converting the color space of the HDR video signal input 310 (e.g., a linear floating point RGB) to a color space for compression (e.g., 10-bit YCbCr). A linear to non-linear conversion with TF 320 (e.g., linear RGB to non-linear RGB) may be applied to the input HDR video signal 310. A float point to fixed point conversion 340 (e.g., quantizing sample value in floating point to 10-bit) may be performed on an output of the color space conversion 330 (e.g., RGB to YCbCr). A chroma format conversion 350 (e.g., chroma 4:4:4 to 4:2:0) may be performed on an output of the float point to fixed point conversion 340. An output of the preprocessing 302 may be encoded 360 into an encoded bitstream 370. The encoding 360 may include compression with a single layer codec (e.g., HEVC Main 10 profile coder) or a scalable codec (e.g., SHVC Scalable Main 10 profile coder). The encoded bitstream 370 may be sent to a decoder.

An encoded bitstream 315 (e.g., such as the encoded bitstream 370) may be decoded 325. For example, decompression 325 with a single layer codec or a scalable codec may be applied to the encoded bitstream 315. Post-processing 303 (e.g., HDR post-processing) may be applied to the output of the decoding 325. The HDR post-processing 303 may include performing an inverse chroma format conversion 335 (e.g., chroma 4:2:0 to 4:4:4). The HDR post-processing 303 may include performing an inverse conversion from fixed point to floating point 345 (e.g., 10-bit to floating point). The HDR post-processing 303 may include performing an inverse color space conversion 355 (e.g., YCbCR to RGB). The HDR post-processing 303 may include performing a conversion from non-linear to linear with an inverse TF 365. The inverse TF 365 may be an electro-optical transfer function (EOTF). The output of the HDR post-processing 303 may include an HDR video signal 375. A performance evaluation of HDR coding may differ from a performance evaluation of SDR coding. The performance evaluation of HDR coding may include the preprocessing and the post-processing (e.g., performed between E and E' point at various bitrates). Distortion may be introduced in the preprocessing and/or post-processing (e.g., before compression and/or after decompression). The workflow involves several format conversions (e.g., linear to non-linear, one color space to another, one chroma format to another, sample value range conversion, etc.). An objective quality metrics calculation (e.g., tPSNR, mPSNR, PSNR_DE2000) may consider one or more of the several format conversions. A conversion and/or metrics calculation tool may be used. The objective metric calculation result may be platform dependent (e.g., because a floating point calculation may be used). In the HDR coding process, one or more information may be signaled (e.g., such as the transfer function, color space, and/or tone mapping).

One or more tools defined in HEVC may be related to HDR and/or WCG. The one or more tools defined in HEVC may include one or more video signal type related syntax elements defined in VUI, a tone mapping information SEI message, a mastering display color volume SEI message, a color remapping information SEI message, a knee function information SEI message, and/or a CGS/BDS look-up table in Picture Parameter Set.

The one or more video signal type related syntax elements defined in VUI may include "video_full_range_flag," "color_primaries," "transfer_characteristics," and/or "matrix- _coeffs." The one or more video signal type related syntax elements defined in VUI may define one or more properties of the coded video container (e.g., sample value range, color primaries, transfer function, color space, and/or the like) to map video sample code levels to display intensities.

The tone mapping information SEI message may include one or more methods to transmit one or more curves within a bitstream. Each of the one or more curves may target a different mapping scenario. The tone mapping information SEI message may enable remapping of one or more color samples of output decoded pictures (e.g., for customization to particular display environments).

The mastering display color volume SEI message may signal information of a display monitor used during grading of video content. The signaled information may include a brightness range, one or more color primaries, and/or a white point.

The color remapping information SEI message may be configured to enable remapping of one or more reconstructed color samples of the output pictures.

The knee function information SEI message may be configured to enable mapping of one or more color samples of decoded pictures (e.g., for customization to particular display environments). A knee function may include a piecewise linear function.

The CGS/BDS look-up table in Picture Parameter Set may include defining color mapping between a base layer and a SHVC enhancement layer (e.g., from BT.709 base layer to BT.2020 enhancement layer). The CGS/BDS look-up table in Picture Parameter Set may enable hit depth and/or color gamut scalability.

When compared to SDR video, one or more artifacts (e.g., chroma artifacts) in HDR video may be more visible (e.g., in medium and low bit rates) on HDR displays. An HDR display may be a display with a peak luminance of 4000 nits. The one or more artifacts in HDR video may include a hue change of one or more objects (e.g., a white wall may appear light red or blue, and the skin color of a subject may not appear natural). The one or more artifacts may become more severe when the scene becomes brighter. For example, the one or more artifacts may flicker when the video is played in real-time. The one or more artifacts may degrade the viewing experience. An objective metric (e.g., tPSNR, mPSNR and PSNR_DE2000) may be calculated in the XYZ color space instead of in the coding color space (e.g., YCbCr). An approximate YCbCr to XYZ conversion in BT.2020 color gamut may be calculated. For example, Equations (1) and (2) may be used to approximate YCbCr to XYZ conversion in BT.2020 color gamut.

$$\begin{pmatrix} R \\ G \\ B \end{pmatrix} = \begin{pmatrix} 0.262700 & 0.678000 & 0.059300 \\ -0.139630 & -0.360370 & 0.500000 \\ 0.500000 & -0.459786 & -0.040214 \end{pmatrix}^{-1} \begin{pmatrix} Y \\ Cb \\ Cr \end{pmatrix} \quad (1)$$

$$\begin{pmatrix} X \\ Y \\ Z \end{pmatrix} = \begin{pmatrix} 0.636958 & 0.144617 & 0.16881 \\ 0.262700 & 0.677998 & 0.059302 \\ 0.0 & 0.028073 & 1.060985 \end{pmatrix} \begin{pmatrix} R \\ G \\ B \end{pmatrix} \quad (2)$$

The distortion of a chroma component in the coding color space may contribute to one or more errors in one or more of the three components in the native XYZ color space. When compared to SDR coding, preserving chroma quality during HDR coding may be more important.

Cross-plane filtering may be applied in HDR coding and/or SDR coding. For example, the cross-plane filtering may include applying one or more high pass filters to a video signal. The cross-plane filtering may use high frequency information from a luma component to improve and/or enhance a quality of one or more chroma components. For example, high frequency luma information may be extracted by applying a high pass filter to the luma component of the video signal. The output of applying the high pass filter to the luma component of the video signal may be added to one or more chroma components of the video signal. The one or more chroma components of the video signal may correspond to the luma component of the video signal. The cross-plane filtering may be used as part of an inter-layer processing, in scalable coding. The cross-plane filtering may be used as in-loop and/or post-loop filters (e.g., in a single layer codec). HDR video may include more details in both luma and chroma components than SDR video. The cross-plane filtering may be applied to HDR coding (e.g., to improve the quality of the reconstructed chroma signal).

One or more correlations may be determined between luma and chroma components. For example, a correlation may be determined for an object contour and/or an edge area. Cross-plane filtering may be applied to a video signal (e.g., for chroma enhancement). The cross-plane filtering may include high pass filtering. For example, a high pass filter (e.g., a cross-plane filter) may be applied to a luma component of the video signal. An output may be determined by applying the high pass filter to the luma component of the video signal. The output of the cross-plane filter may be added to a chroma component (e.g., that corresponds to the luma component) of the video signal. An example chroma enhancement filtering process may be represented by Equations (3) and (4).

$$Y\_offset4C = Y\_rec \otimes filter\_Y4C \quad (3)$$

$$C\_imp = C\_rec + Y\_offset4C \quad (4)$$

As illustrated in Equations (3) and (4), the luma component may be represented by Y and the chroma component may be represented by C. The filter applied to the luma signal may be represented by filter_Y4C. The reconstructed luma signal may be represented by Y_rec. The output of the filtering may be represented by Y_offset4C. The reconstructed chroma signal may be represented by C_rec. The reconstructed chroma signal may be a Cb component and/or a Cr component. An improved chroma component may be represented by C_imp. The cross-plane filter may be a one dimensional, a two dimensional separable, or a two dimensional non-separable filter. The cross-plane filter may be derived (e.g., generated) based on the chroma and/or luma components of the input signal. The cross-plane filter may be based on reconstructed chroma and/or luma signal (e.g., using the Least Square method). The cross-plane filter may be applied to improve chroma quality in the coding color space. The cross-plane filter may improve one or more (e.g., three) components in the native XYZ, color space.

Chroma enhancement filtering may be performed in HDR coding. Chroma enhancement filtering may include cross-plane filtering. An HDR coding process may include one or more post-processing stages (e.g., after decoding). The one or more post-processing stages may include a chroma format conversion from 4:2:0 to 4:4:4, a conversion from 10-bit fixed point to floating point, a color space conversion from YCbCr to RGB and/or a conversion from non-linear signal to linear signal with an inverse transfer function (e.g., as illustrated in FIG. 3B). The chroma enhancement filtering may be applied before or after any stage of the one or more post-processing stages. For example, the chroma enhancement filtering may be applied to the luma component of a video signal in 4:2:0 format. The chroma enhancement filtering may be applied (e.g., an offset may be added) to a chroma component of the video signal in 4:2:0 or 4:4:4 format.

Figure 4A:
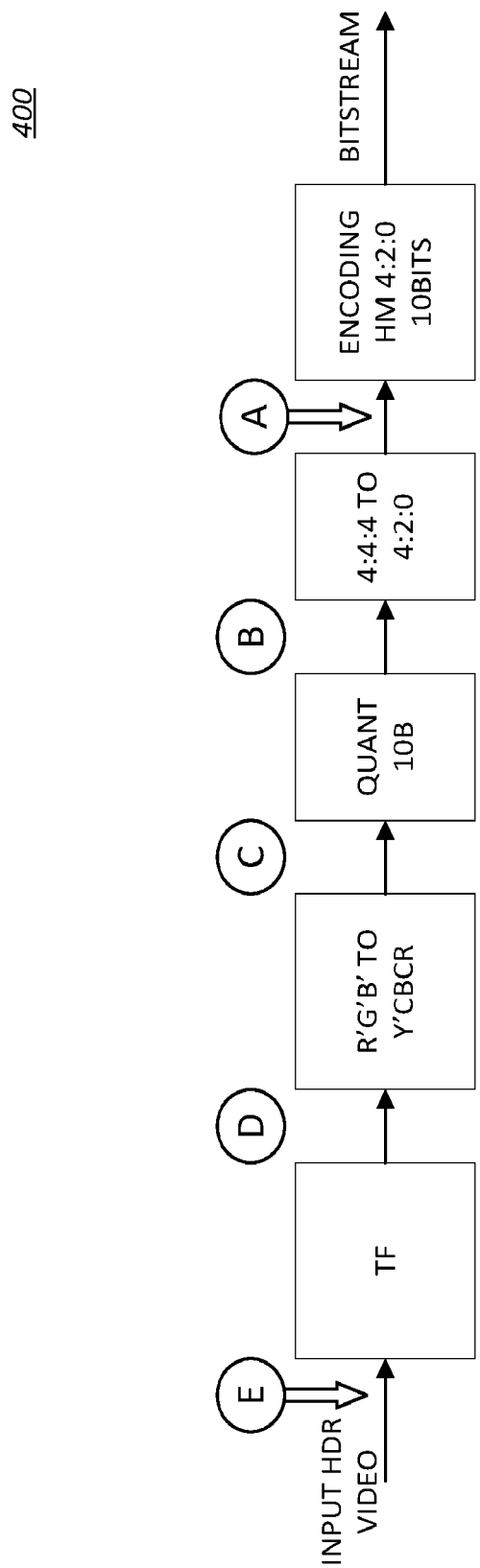
FIG. 4A is a flow diagram illustrating an example HDR coding process with chroma enhancement filtering.
Figure 4B:
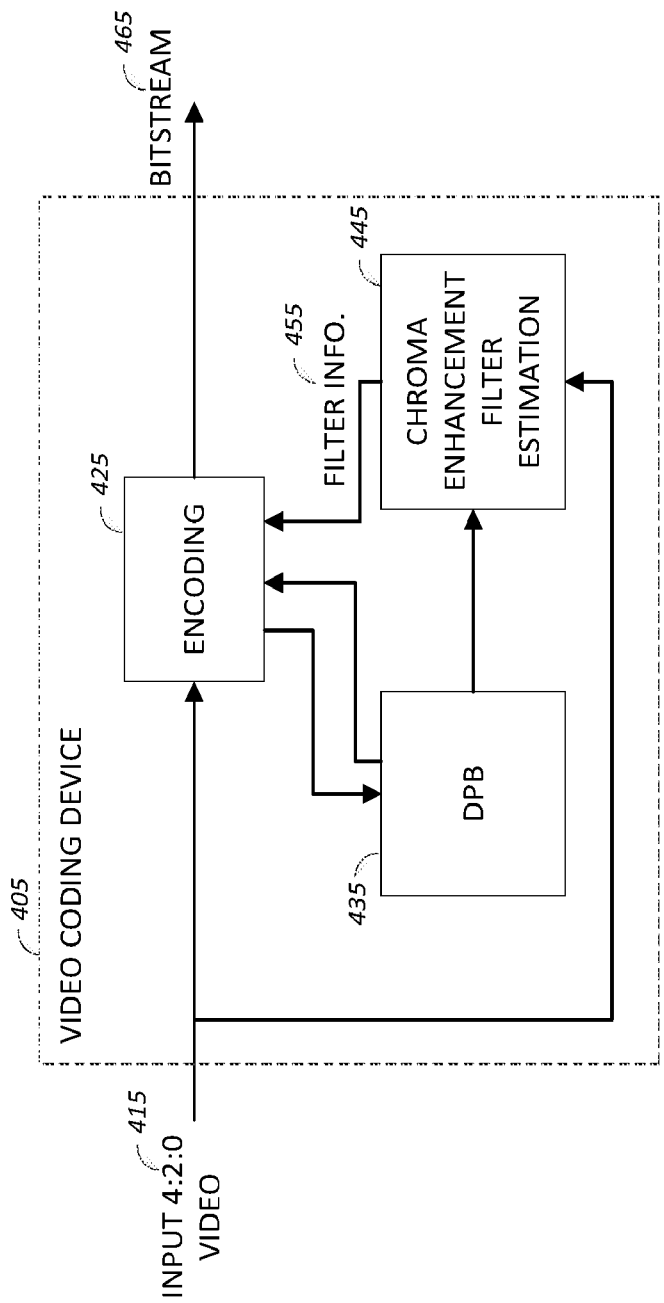
FIG. 4B is a diagram illustrating an example application of a chroma enhancement filter estimation at an encoder.

FIG. 4A is a flow diagram illustrating an example HDR coding process 400 (e.g., such as the example HDR coding process 300 shown in FIG. 3A). FIG. 4B is a diagram illustrating an example application of a chroma enhancement filter estimation 445 at a video coding device 405. The video coding device 405 may include an encoder, a decoder, a WTRU, and/or the like. The chroma enhancement filter estimation 445 may be performed using a reconstructed picture (e.g., a reconstructed luma signal and/or a reconstructed chroma signal) from a decoded picture buffer 435 (DPB) and/or an original picture input to the encoder in the coding color space (e.g., YCbCr 4:2:0). The input video signal 415 may be encoded 425 using a reconstructed picture from the DPB 435. The chroma enhancement filter information 455 may be included in an encoded bitstream 465. The chroma enhancement filter information 455 may include one or more chroma enhancement filter parameters.

Figure 4C:
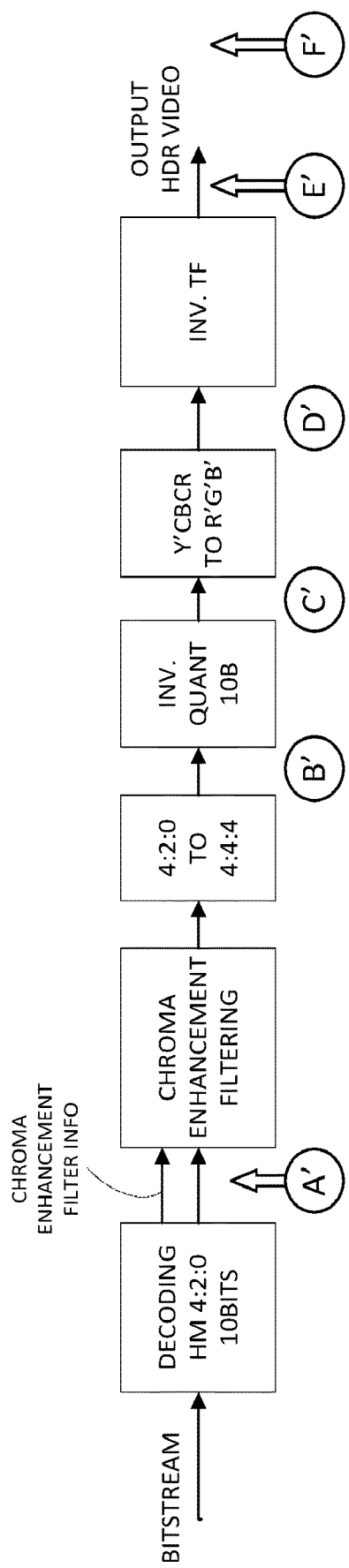
FIG. 4C is a flow diagram illustrating an example HDR decoding process with chroma enhancement filtering applied prior to other post-processing.

FIG. 4C is a flow diagram illustrating an example HDR decoding process 410 (e.g., such as the example HDR decoding process 305 shown in FIG. 3B) with chroma enhancement filtering. The chroma enhancement filter may be applied to a reconstructed luma signal (e.g., a reconstructed luma component of a sample). The chroma enhancement filter may be applied prior to other post-processing (e.g., such as at point A', before chroma upsampling). The chroma enhancement filtering output may be added to a reconstructed chroma signal (e.g., a reconstructed chroma component that corresponds to the reconstructed luma component) in 4:2:0 chroma format. For example, the chroma enhancement filter may be applied to a luma plane component of a color sample to determine an offset. A color sample may include a luma sample and two chroma samples. The offset may be added to the reconstructed chroma component of the color sample. The reconstructed chroma component of the color sample may correspond to the luma component of the color sample. The offset may be added to the reconstructed chroma component of the color sample before the video signal is upsampled (e.g., added to the reconstructed chroma component in 4:2:0 format). For example, the luma plane component and the reconstructed chroma component may have different spatial dimensions (e.g., 4:2:0 format). When applied prior to post-processing, the chroma enhancement filtering complexity may be low (e.g., because the chroma resolution is ¼ of picture size in the 4:2:0 chroma format). The chroma enhancement filter may improve the chroma signal (e.g., by correcting some errors introduced in compression).

Figure 5A:
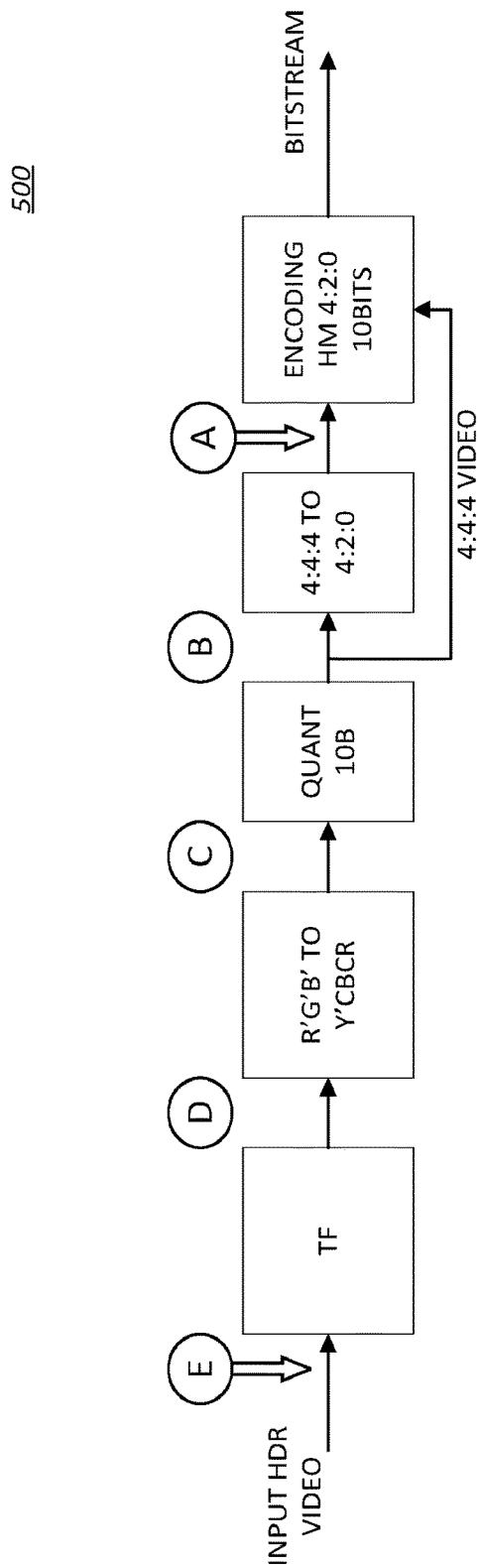
FIG. 5A is a flow diagram illustrating an example HDR coding process with chroma enhancement filtering.
Figure 5B:
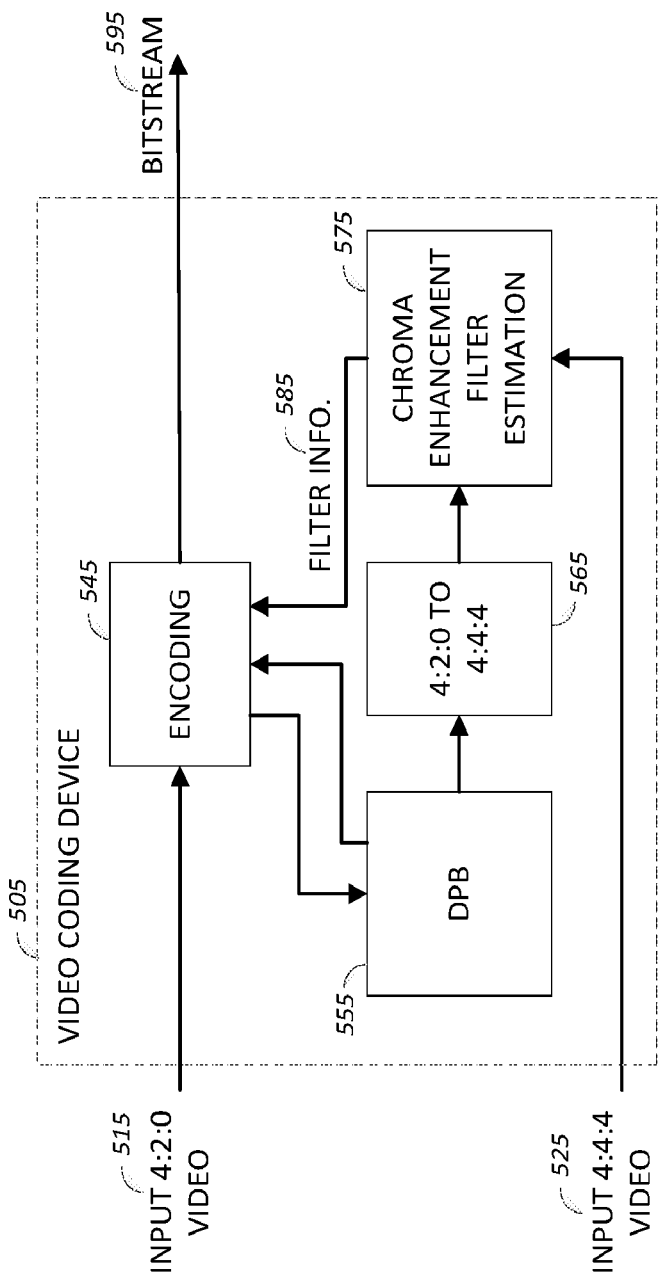
FIG. 5B is a diagram illustrating an example application of a chroma enhancement filter estimation in 4:4:4 chroma format at an encoder.

FIG. 5A is a flow diagram illustrating an example HDR coding process 500 (e.g., such as the example HDR coding process 300 shown in FIG. 3A). The example HDR coding process 500 may include a 4:4:4 video signal being used for compression of a 4:2:0 video signal. The 4:4:4 video signal may be included in an encoded bitstream with the 4:2:0 video signal. FIG. 5B is a diagram illustrating an example application of a chroma enhancement filter at a video coding device 505. The video coding device 505 may include an encoder, a decoder, a WTRU, and/or the like. The input for a chroma enhancement filter estimation 575 may include a chroma upsampling from 4:2:0 to 4:4:4 565 applied to a reconstructed chroma signal from a DPB 555 and/or a to 4:4:4 input video 525. The video coding device 505 may receive a 4:2:0 input video signal 515. The reconstructed chroma signal from the DPB 555 and/or filter information 585 from the chroma enhancement filter estimation 575 may be encoded 545 into an encoded bitstream 595. The filter information 585 may include one or more chroma enhancement filter parameters (e.g., such as one or more indications, and/or one or more filter coefficients).

Figure 5C:
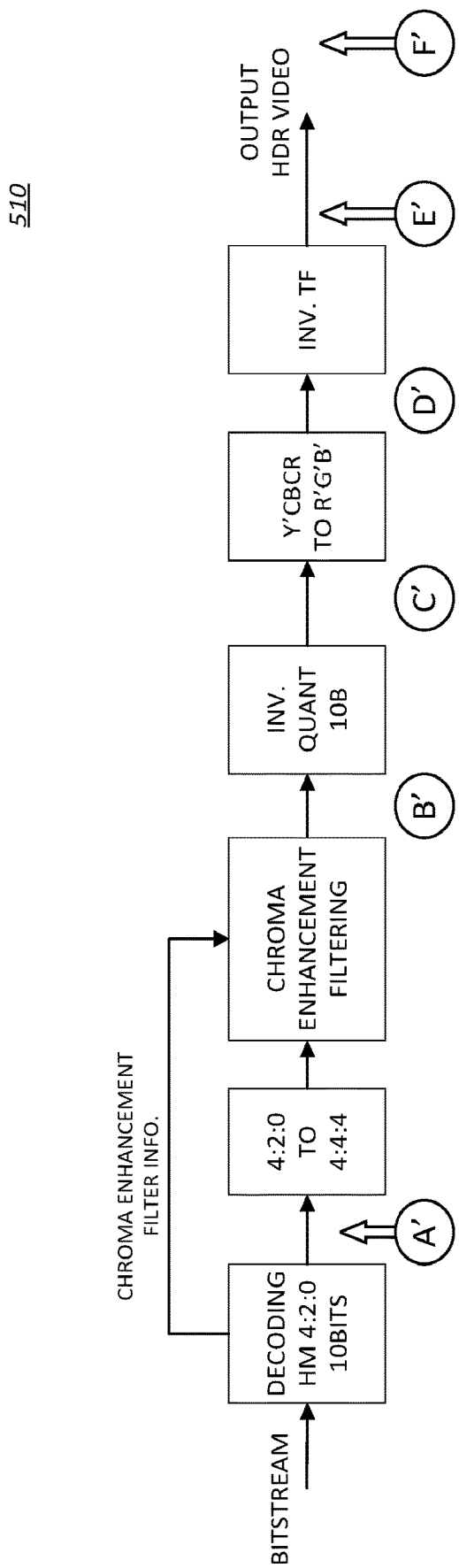
FIG. 5C is a flow diagram illustrating an example HDR decoding process with chroma enhancement filtering applied during post-processing.

FIG. 5C is a flow diagram illustrating an example HDR decoding process 510 (e.g., such as the example HDR decoding process 305 shown in FIG. 3B) with chroma enhancement filtering applied during post-processing. The chroma enhancement filter may be applied during post-processing (e.g., at point B', C', or D'; after upsampling). An encoded bitstream may be received. The encoded bitstream may include one or more chroma enhancement filter parameters. The chroma enhancement filtering output may be added to the upsampled chroma signal in 4:4:4 format using a reconstructed chroma signal (e.g., a reconstructed chroma plane component). For example, the chroma enhancement filter may be applied to a luma plane component of a color sample to determine an offset. The offset may be added to the reconstructed chroma plane component of the color sample. The reconstructed chroma plane component of the color sample may correspond to the luma plane component of the color sample. The offset may be added to the reconstructed chroma plane component of the color sample after the video signal is upsampled (e.g., added to the upsampled reconstructed chroma plane component in 4:4:4 format). For example, the luma plane component and the reconstructed chroma plane component may have the same spatial dimensions in chroma 4:4:4 format. When the chroma enhancement filtering is applied during post-processing, the chroma enhancement filtering may correct one or more errors introduced during chroma downsampling and/or upsampling. The chroma signal may be improved when the chroma enhancement filtering is applied during post-processing. In chroma 4:2:0 format, the respective chroma and luma sampling positions may be misaligned (e.g., phase shifted). The phase shifting between the respective luma and chroma sampling positions may be considered when determining a shape (e.g., selecting the proper shape) of the filter. In chroma 4:4:4 format, the respective chroma and luma sampling positions may be aligned (e.g., phase aligned). The width and/or the height of a chroma enhancement filter may include an odd number (e.g., to ensure no phase shifting). The chroma enhancement filter shape may be one dimensional, two dimensional square, or two dimensional non-square.

The chroma upsampling process (e.g., 4:2:0 to 4:4:4) and the chroma enhancement filter process may be performed in one post-processing step. For example, as chroma upsampling is being performed, at each chroma sample location, a corresponding Y_offset4C may be calculated (e.g., using the neighboring luma samples according to Equation (3)). The corresponding Y_offset4C may be added to the upsampled chroma sample, according to Equation (5), where filter_upC may represent the chroma upsampling filter.

$$C\_out = C\_rec \otimes filter\_upC + Y\_offset40C \qquad (5)$$

Figure 6A:
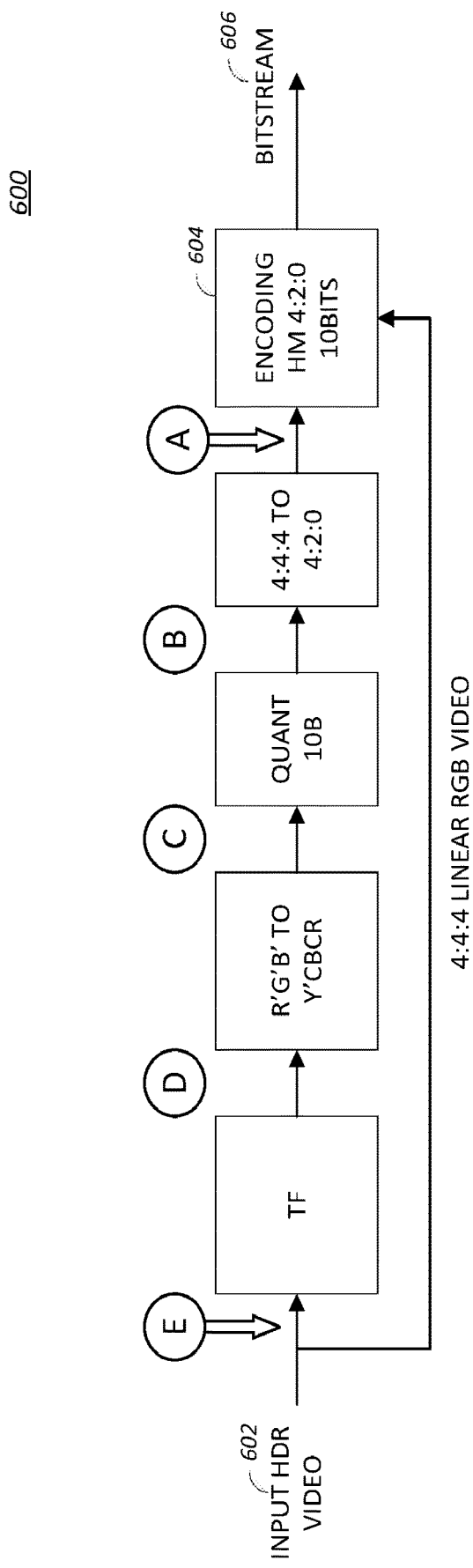
FIG. 6A is a flow diagram illustrating an example HDR coding process with chroma enhancement filtering.
Figure 6B:
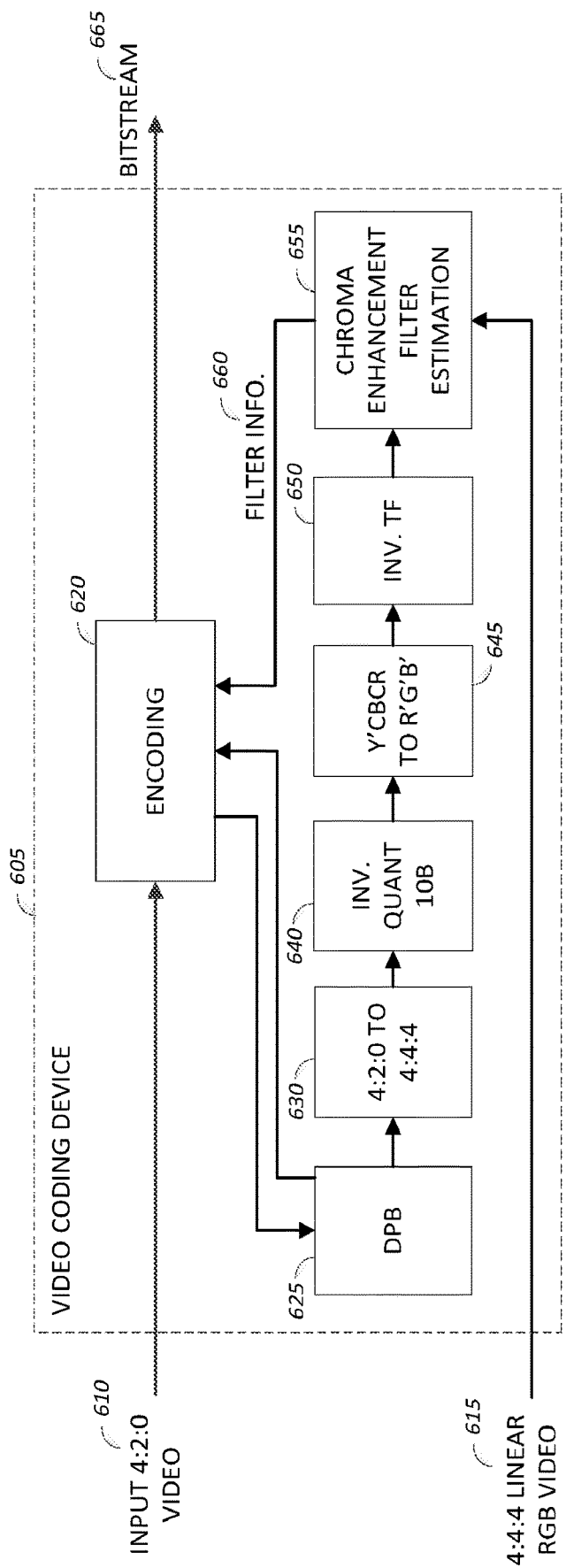
FIG. 6B is a diagram illustrating an example application of a chroma enhancement filter estimation at an encoder.

FIG. 6A is a flow diagram illustrating an example HDR coding process 600 (e.g., such as the example HDR coding process 300 shown in FIG. 3A). Information from an input HDR video signal 602 (e.g., in 4:4:4 linear RGB format) may be used in the encoding 604. For example, chroma enhancement filter information in 4:4:4 information may be used in the encoding 604 and/or included in an encoded bitstream 606. FIG. 6B is a diagram illustrating an example application of a chroma enhancement filter at a video coding device 605. The video coding device 605 may include an encoder, a decoder, a WTRU, and/or the like. An input video signal 610 (e.g., in 4:2:0 format) and/or an upsampled video signal 615 (e.g., a 4:4:4 linear RGB video signal). An inverse chroma format conversion 630 (e.g., chroma 4:2:0 to 4:4:4) may be applied to a picture from a DPB 625. An inverse conversion from fixed point to floating point 640 (e.g., 10-bit to floating point) may be performed. An inverse color space conversion 645 (e.g., YCbCr to RGB) may be performed. A conversion from non-linear to linear may be performed with an inverse TF 650. A chroma enhancement filter estimation 655 may be performed. The chroma enhancement filter estimation 655 may be based on the upsampled video signal 615 (e.g., a 4:4:4 linear RGB video signal). Filter information 660 may be used in the encoding 620. For example, the filter information may be included in an encoded bitstream 665. The filter information 660 may include one or more chroma enhancement filter parameters such as one or more indications and/or one or more filter coefficients).

Figure 6C:
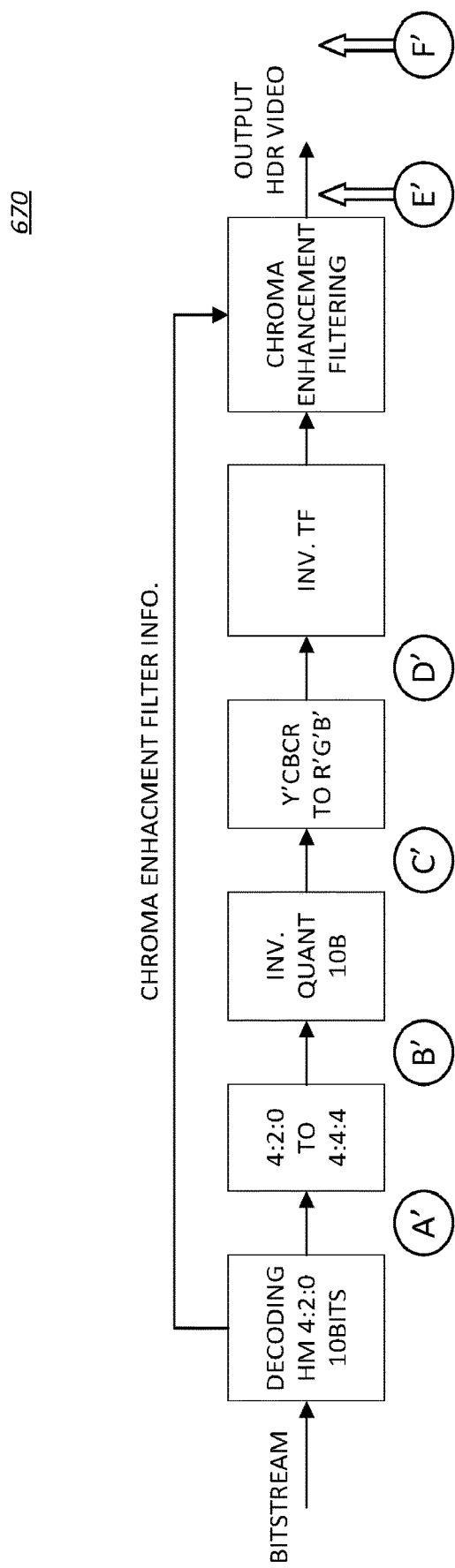
FIG. 6C is a flow diagram illustrating an example HDR decoding process with chroma enhancement filtering applied following post-processing.

FIG. 6C is a flow diagram illustrating an example HDR decoding process 670 (e.g., such as the example HDR decoding process 305 shown in FIG. 3B) with chroma enhancement filtering applied following post-processing (e.g., at point E', after upsampling). The example HDR decoding process 670 may receive an encoded bitstream. The encoded bitstream may include one or more chroma enhancement filter parameters. The one or more enhancement filter parameters may indicate whether to apply chroma enhancement filtering. For example, a chroma enhancement filter may be applied to a luma plane component of a sample to determine an offset. The offset may be added to one or more reconstructed chroma plane components of the sample. The one or more reconstructed chroma plane components of the sample may correspond to the luma plane component of the sample. The offset may be added to the one or more reconstructed chroma plane components of the sample after the video signal is upsampled (e.g., added to the upsampled reconstructed chroma component in 4:4:4 format). When applied following post-processing, the chroma enhancement filter may consider one or more distortions introduced in pre-processing. The chroma enhancement filter may be applied to a linear signal which is represented in floating point. The chroma enhancement filter may correct one or more errors caused in coding and/or preprocessing.

A cross-plane filter (e.g., a high pass filter) may be generated based on a characteristic associated with a picture of a video signal. For example, the characteristic may include a spatial region, a color, a luminance, an edge direction, and/or the like. A sample set including one or more samples of the picture may be determined. The one or more samples may be associated with the characteristic. For example, the one or more samples may be determined to be associated with the characteristic. For example, when the characteristic includes a color, the sample set may include the one or more samples within the picture that match the color. As another example, when the characteristic includes a luminance, the sample set may include the one or more samples within the picture having a luminance value within a predetermined luminance range. As another example, when the characteristic includes an edge direction, the sample set may include the one or more samples within the picture having a dominant edge direction that matches the edge direction. The cross-plane filter may be applied to the one or more samples in the sample set. For example, the cross-plane filter may be applied to the luma plane components of the one or more samples in the sample set. One or more offsets may be determined by applying the cross-plane filter to the luma plane components of the one or more samples in the sample set. The one or more offsets may be added to the corresponding reconstructed chroma plane components (e.g., Cr and/or Cb components) of the one or more samples in the sample set.

A cross-plane (e.g., chroma enhancement) filter may be determined (e.g., generated) based on a characteristic. A spatial region may be an example of a characteristic. A cross-plane filter based on a spatial region may include applying a cross-plane filter (e.g., a high pass filter) to one or more samples in a spatial region. For example, a picture may be segmented into a plurality of spatial regions. Each spatial region may be associated with a set of chroma enhancement filters for two chroma components (e.g., Cb, Cr). One or more of the plurality of spatial regions may be associated with a chroma enhancement filter (e.g., one set of chroma enhancement filters). The chroma enhancement filter may be determined based on the one or more of the plurality of spatial regions (e.g., to get better filtering performance). The chroma enhancement filter may introduce a region boundary issue, when there are a plurality of spatial regions. The chroma enhancement filter may be overlapped (e.g., to reduce the effects of the region boundary issue). The overlapped chroma enhancement filter may not eliminate the region boundary issue. The chroma enhancement filter may be applied to one or more spatial regions (e.g., only spatial regions) of interest (e.g., to reduce complexity). A spatial region may include a two dimensional non-overlapped rectangle. The spatial region may include an irregular shape. For example, a picture may be partitioned into a plurality of two dimensional non-overlapped rectangles. If the partition is even, the position and size of each spatial region may not be signaled. If the partition is uneven, the top left corner position, width and/or height of each spatial region may be signaled. A video coding device may determine to apply a filter to a spatial region. An indication may sent when the video coding device determines to apply a filter to the spatial region. For example, one or more filter indications may be signaled. The one or more filter indications may include a filter on/off flag and/or a filter index. The one or more filter indications may be associated with each spatial region. The one or more filter indications may be associated with one of the plurality of spatial regions. The one or more filter indications may indicate related filter information applied to each respective spatial region.

A cross-plane filter based on a characteristic may include applying a cross-plane filter (e.g., a high pass filter) to a sample set associated with one or more characteristics (e.g., luminance, colors). One or more characteristics may be defined for a picture. A characteristic may be associated with a filter set. A plurality of characteristics may share a cross-plane filter. The cross-plane filter may be determined (e.g., trained) based on one or more samples belonging to the one or more associated sample sets (e.g., characteristic sets). For example, the cross-plane filter may be applied to the one or more samples belonging to the one or more associated characteristic sets. The one or more samples may correspond to one or more pixels in a picture of the video signal. For example, a sample may correspond to a pixel position. For example, an artistic intent based video coding may include signaling artistic intent characteristic sample sets and/or identifying one or more artistic intent sample locations associated with the signaled sample sets. When the sample sets are related to artistic intent, a chroma enhancement filter may be generated and/or determined (e.g., custom trained) based on one or more samples (e.g., chroma samples) that belong to the artistic intent characteristic sample sets. The chroma enhancement filter may enhance the one or more samples of a sample set. For example, the chroma enhancement filter may be applied to a reconstructed luma component of a sample in the sample set to determine an offset. The offset may be added to a reconstructed chroma component of the sample. The reconstructed chroma component may correspond to the reconstructed luma component.

For example, the characteristic may be identified as an edge direction. The edge direction may include a luma component edge direction. The luma component edge direction characteristic may be used to classify one or more samples into one or more sample sets (e.g., categories). The edge direction θ and edge strength s may be calculated as:

$$\theta(i, j) = \arctan \frac{g_y(i, j)}{g_x(i, j)}$$

$$s(i, j) = |g_x(i, j)| + |g_y(i, j)|$$

Figure 7:
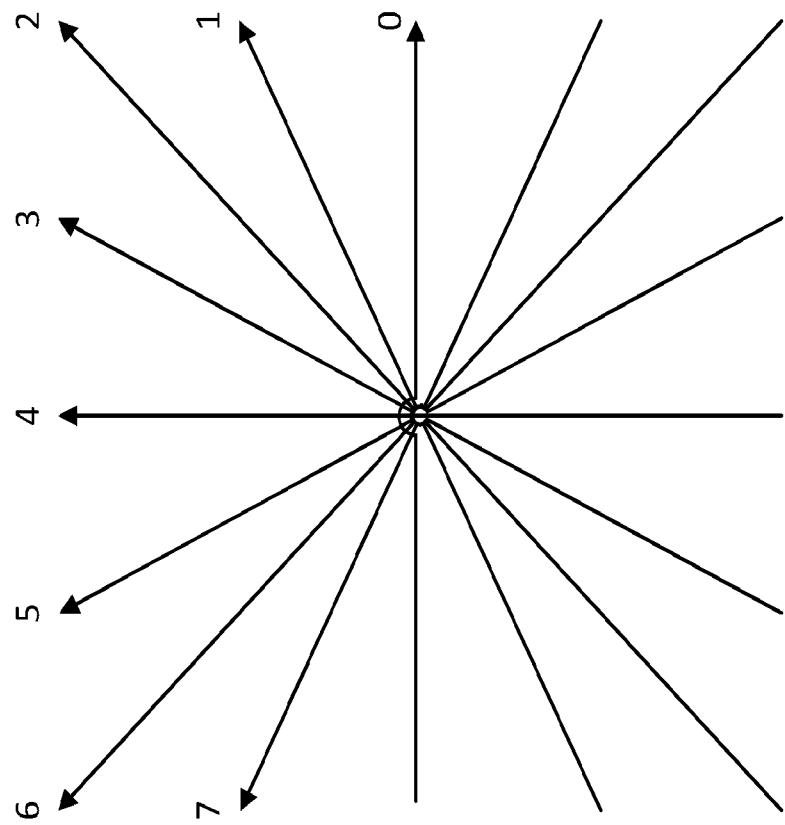
FIG. 7 is a diagram illustrating an example edge direction quantized into eight (8) discrete degrees.

The $g_x(i, j)$ and $g_x(i, j)$ may represent a gradient in the horizontal and the vertical directions at position (i, j), respectively. The edge direction θ may be quantized into N discrete degrees within the range of zero to 180 degrees (e.g., 8 directions). FIG. 7 is a diagram illustrating an example edge direction 700 quantized into eight (8) discrete degrees. A histogram of gradient within a window centered at a sample to be classified may be calculated as:

$$H(k) = \sum_{(i,j) \in W, \theta(i,j)=k} s(i, j)$$

In the histogram of gradient H(k), W may represent a window centered at the sample to be classified and/or k may represent an edge direction range from 0 to N-1 (e.g., inclusive). A dominant edge direction may be determined. The dominant edge direction may be determined as a direction with a maximum value (e.g., the greatest value) in the histogram of gradient H(k). The dominant edge direction may be used as the edge direction of the sample. Each sample in the picture having a dominant edge direction that matches the edge direction may be determined to be in a sample set. One or more chroma enhancement filters may be determined (e.g., trained) based on the classification of the sample as part of the sample set. One or more chroma enhancement filters may be applied to one or more samples based on the classification. For example, a chroma enhancement filter may be applied to each sample in the sample set. The classification of the sample may be based on a reconstructed luma component (e.g., so it can be carried in decoder side also). For each picture, a chroma enhancement filter (e.g., one or more filter coefficients) may be signaled for each direction. One chroma enhancement filter (e.g., one or more filter coefficients) may be signaled for multiple directions (e.g., to reduce complexity). For example, if the edge strength of the dominant direction of a luma sample is smaller than a pre-defined threshold, the chroma enhancement filter may not applied to that luma sample and/or the chroma offset may be determined to be (e.g., directly inferred as) zero.

Chroma enhancement filter (e.g., cross-plane filter) information may be signaled. The chroma enhancement filter information may include one or more chroma enhancement filter parameters. The one or more chroma enhancement filter parameters may include one or more of a scaling factor, one or more cross-plane filter coefficients, a shifting parameter, a chroma enhancement indication, and/or a chroma component indication. The one or more cross-plane filter coefficients may be signaled for each chroma component. The chroma enhancement indication may include an enabled flag in a signaling message. The enabled flag may be signaled for each chroma component. The chroma enhancement filter information may be signaled in slice level as in-band metadata. The chroma enhancement filter information may be signaled as separate NAL unit packets such as Adaptive Parameter Set (APS). The chroma enhancement filter information may be signaled as one or more out-band messages such as Supplemental Enhancement Information (SEI) messages. Each SEI message may signal one set of chroma enhancement filters (e.g., if there are multiple chroma enhancement filter SEI messages signaled for one slice/picture). Signaling the chroma enhancement filter information via one or more SEI messages may be implemented by extending SEI message definitions. An example of signaling the chroma enhancement filter information via one or more HEVC SEI messages (e.g., the proposed SEI message syntax) is shown in Table 2 and Table 3.

TABLE 2

| | Descriptor |
|---|---|
| sei_payload( payloadType, payloadSize ) { <br>   if( nal_unit_type = = PREFIX_SEI_NUT ) <br>     if( payloadType = = 0 ) <br>       buffering_period( payloadSize ) <br>     ... <br>     else if( payloadType = = 180 ) <br>       multiview_view_position( payloadSize ) /* specified in Annex G */ <br>     else if( payloadType = = 181 ) <br>       chroma_enhancement_filter( payloadSize ) <br>     else <br>       reserved_sei_message( payloadSize ) <br>   else /* nal_unit_type = = SUFFIX_SEI_NUT */ <br>     if( payloadType = = 3) <br>       filler_payload( payloadSize ) <br>     ... <br>     else <br>       reserved_sei_message( payloadSize ) <br>   if( more_data_in_payload( ) ) { <br>     if( payload_extension_present( ) ) <br>       reserved_payload_extension_data | <br><br><br><br><br><br><br><br><br><br><br><br><br><br><br><br><br>u(v) |

TABLE 2-continued

| | Descriptor |
|---|---|
|     payload_bit_equal_to_one /* equal to 1 */ | f(1) |
|     while( !byte_aligned( ) ) | |
|         payload_bit_equal_to_zero /* equal to 0 */ | f(1) |
|   } | |
| } | |

TABLE 3

| | Descriptor |
|---|---|
| chroma_enhancement_filter (payloadSize ) { | |
|   chroma_enhancement_filter_enabled_flag | u(1) |
|   if (chroma_enhancement_filter_enabled_flag) { | |
|     num_coeff_hori_minus1 | ue(v) |
|     num_coeff_verti_minus1 | ue(v) |
|     cb_enhancement_flag | u(1) |
|     if (ch_enhancement_flag) { | |
|       for ( i=0; i<( (num_coeff_hori_minus1+1)×(num_coeff_verti_minus1+1)−1 ); i++ ) | |
|         cb_filter_coeff_plus8[i/(num_coeff_hori_minus1+1)][i%(num_coeff_hori_minus1+1)] | u(4) |
|       cb_scaling_factor_abs_minus1 | u(10) |
|       cb_scaling_factor_sign | u(1) |
|       cb_bit_shifting | u(5) |
|     } | |
|     cr_enhancement_flag | u(1) |
|     if ( cr_enhancement_flag) { | |
|       for ( i=0; i<( (num_coeff_hori_minus1+1)×(num_coeff_verti_minus1+1)−1 ); i++ ) | |
|         cr_filter_coeff_plus8[i/(num_coeff_hori_minus1+1)][i%(num_coeff_hori_minus1+1)] | u(4) |
|       cr_scaling_factor_abs_minus1 | u(10) |
|       cr_scaling_factor_sign | u(1) |
|       cr_bit_shifting | u(5) |
|     } | |
|   } | |
| } | |

A cross-plane filter may be indicated. For example, the one or more cross-plane filter parameters may be indicated. The one or more cross-plane filter parameters may indicate whether to apply cross-plane filtering (e.g., chroma enhancement filtering). For example, when the chroma_enhancement_filter_enabled flag is equal to 1, chroma enhancement may be enabled. When the chroma_enhancement_filter_enabled_flag is equal to 0, chroma enhancement may be disabled. When not present, the chroma_enhancement_filter_enabled_flag may be determined to be equal to 0.

The num_coeff_hori_minus1 plus one may indicate a number of coefficients in a horizontal direction of one or more chroma enhancement filters.

The num_coeff_verti_minus1 plus one may indicate a number of coefficients in a vertical direction of the one or more chroma enhancement filters.

When the cb_enhancement_flag is equal to 1, cb_filter_coeff_plus8 [i], cb_scaling_factor_abs_minus1, cb_scaling_factor_sign, and/or cb_bit_shifting may be included in the SEI message. When the cb_enhancement_flag is equal to 0, cb_filter_coeff_plus8 [i], cb_scaling_factor_abs_minus1, cb_scaling_factor_sign, and cb_bit_shifting may not be included in the SEI message. When not present in the message, the cb_enhancement_flag may be determined to be equal to 0.

The cb_filter_coeff_plus8 [j][i] minus 8 may specify a filter coefficient of a high pass filter for the chroma component Cb at position (i, j). The value of cb_filter_coeff_plus8 [j][i] may be within a range of 0 to 15 (e.g., inclusive). The filter coefficient cb_filter_coeff [j][i] may be determined (e.g., derived) if it is not the last coefficient in the raster scan order, where i is in the range [0, num_coeff_hori_minus1], and j is in the range [0, num_coeff_verti_minus1]. For example, $$cb\_filter\_coeff[j][i]=cb\_filter\_coeff\_plus8[j][i]-8$$

The example syntax and semantics may assume that the value of cb_filter_coeff[j][i] is in the range of [−8,7]. The value of cb_filter_coeff[j][i] may be outside the range of [−8,7].

When one or more cb_filter_coef[j][i] values sum up to 0 (e.g., such that the high pass nature of the Cb enhancement filter is guaranteed), the last coefficient cb_filter_coeff[num_coeff_verti_minus1][num_coeff_hori_minus1] may be determined. For example, $$cb\_filter\_coeff[num\_coeff\_verti\_minus1][num\_coeff\_hori\_minus1]=-(\Sigma_{j=0}^{num\_coeff\_verti\_minus1-1}\Sigma_{i=0}^{num\_coeff\_hori\_minus1} cb\_filter\_coeff[j][i])-(\Sigma_{i=0}^{num\_coeff\_hori\_minus1-1} cb\_filter\_coeff[num\_coeff\_verti\_minus1][i])$$

The cb_scaling_factor_abs_minus1 plus 1 and the cb_scaling_factor_sign may specify a value of variable CbScalingFactor. For example, $$CbScalingFactor=(1-2*cb\_scaling\_factor\_sign)*(cb\_scaling\_factor\_abs\_minus1+1)$$

The value of cb_scaling_factor_abs may be within the range of 1 to 1023 (e.g., inclusive).

The cb_bit_shifting may specify a number of bits to be right shifted after the scaling process (e.g., to enhance the chroma component Cb). The value of cb_bit_shifting may be in the range of 0 to 31 (e.g., inclusive).

When the cr_enhancement_flag is equal to 1, cr_filter_coeff_plus8 [i], cr_scaling_factor_abs_minus1, cr_scaling_factor_sign, and/or cr_bit_shifting may be included in the SEI message. When the cr_enhancement_flag is equal to 0 cr_filter_coeff_plus8 [i], cr_scaling_factor_abs_minus1, cr_scaling_factor_sign, and cr_bit_shifting may not be included in the SEI message. When not present, the cr_enhancement_flag may be determined to be equal to 0.

The cr_filter_coeff_plus8 [j][i] may specify a filter coefficient of a high pass filter for the chroma component Cr at position (i,j). The value of cr_filter_coeff_plus8 [j][i] may be in the range of 0 to 15 (e.g., inclusive). The filter coefficient cr_filter_coeff [j][i] may be determined (e.g., if it is not the last coefficient in the raster scan order), where i is in the range [0, num_coeff_hori_minus1], and j is in the range [0, num_coeff_verti_minus1]. For example, cr_filter_coeff[j][i]=cr_filter_coeff_plus8[j][i]-8

The example syntax and semantics may assume that the value of cr_filter_coeff[j][i] is in the range of [−8,7]. The value of cr_filter_coeff[j][i] values may be outside the range of [−8,7].

Assuming that the cr_filter_coef [j][i] values sum up to 0, such that a high pass nature of the Cr enhancement filter is guaranteed, a coefficient (e.g., the last coefficient) cr_filter_coeff[num_coeff_verti_minus1][num_coeff_hori_minus1] may be determined. For example, cr_filter_coeff[num_coeff_verti_minus1][num_coeff_hori_minus1]=−($\Sigma_{j=0}^{num\_coeff\_verti\_minus1-1}$ $\Sigma_{i=0}^{num\_coeff\_hori\_minus1-1}$cr_filter_coeff[j][i])−($\Sigma_{i=0}^{num\_coeff\_hori\_minus1-1}$cr_filter_coeff[num_coeff_coeff_verti_minus1][i])

The cr_scaling_factor_abs_minus1 plus 1 and the cr_scaling_factor_sign may specify a value of variable CrScalingFactor. For example, CrScalingFactor=(1−2*cr_scaling_factor_sign)*(cr_scaling_factor_abs_minus1+1)

The value of cr_scaling_factor_abs may be within the range of 1 to 1023 (e.g., inclusive).

The cr_bit_shifting may specify a lumber of bits to be right shifted after the scaling process (e.g., to enhance the chroma component, Cr). The value of cr_bit_shifting may be within the range of 0 to 31 (e.g., inclusive).

The chroma enhancement filter may be applied as follows. A size of the chroma enhancement filter may be signaled in the horizontal and/or vertical directions as filter_width (e.g., equal to num_coeff_hori_minus1+1) and filter_height (e.g., equal to num_coeff_verti_minus1+1), respectively. To enhance a "Ch" component sample at position (x,y), a high-pass filter Ch_filter_coeff may be applied to one or more surrounding (e.g., filter_width× filter_height) samples to generate the intermediate result z(x,y), as below. "Ch" may represent Cb or Cr.

$$z(x, y) = \sum_{j=startV}^{endV} \sum_{i=startH}^{endH} (Ch\_filter\_coef[(j - startV)][(i - startH)]) \times Y(ScaleX \times x + i, ScaleY \times y + j) \quad (6)$$

One or more parameters (e.g., such as startV, startH, endV, and/or endH) may determine the support region of filtering relative to (x,y). The one or more parameters may be calculated as:

$$endV = filter\_height \gg 1 \quad (7)$$

$$startV = 1 - filter\_height + endV \quad (8)$$

$$endH = filter\_width \gg 1 \quad (9)$$

$$startH = 1 - filter\_width + endH \quad (10)$$

(ScaleX, ScaleY) may represent a color subsampling ratio in the horizontal and vertical directions. (ScaleX, ScaleY) may be equal to (1, 1), (2, 1), and (2, 2) for 4:4:4, 4:2:2, and 4:2:0 formats, respectively.

z(x,y) may be scaled to the normal range, denoted as o(x,y). z(x,y) may be scaled using ChScalingFactor/$2^{ch\_bit\_shifting}$. Abs(x) may represent the absolute value of variable x. The integer realization of the scaling may be determined as follows, $$t(x,y)=z(x,y)*ChScalingFactor \quad (11)$$

$$o(x,y)=Sign(t(x,y))*((Abs)(t(x,y))+(1\ll(ch\_bit\_shifting-1)))\gg ch\_bit\_shifting) \quad (12)$$

An enhanced Ch sample, denoted as $Ch_{enh}(x,y)$, may be calculated. For example, $$Ch_{enh}(x,y)=Ch(x,y)+o(x,y) \quad (13)$$

Ch(x,y) in Equation (13) may include an upsampled chroma component value. The chroma enhancement filter may be represented in fixed point. The fixed point chroma enhancement filter may be applied when the sample value is represented in floating point in a large dynamic range (e.g., according to FIGS. 6A, 6B, and 6C). The filter coefficient may be represented as a floating point value (e.g., to maintain accuracy in such a large dynamic range). Table 4 is an example chroma enhancement filter signaling syntax table when the filter coefficients are represented as 16-bit half-floats. The 16-bit half-float format may be used in EXR files and/or computer graphics. The 16-hit half-float may be compliant to IEEE 754 half-precision binary floating point format (e.g., 1 bit for sign, 5 bits for exponent, and 10 for significant precision). The 16-bit half-float format may be converted to single/double precision floating point format based on the IEEE 754 half precision floating point format definition.

TABLE 4

| | Descriptor |
|---|---|
| chroma_enhancement_filter (payloadSize ) { | |
|    chroma_enhancement_filter_enabled_flag | u(1) |
|    if (chroma_enhancement_filter_enabled_flag) { | |
|       num_coeff_hori_minus1 | ue(v) |
|       num_coeff_verti_minus1 | ue(v) |

TABLE 4-continued

| | Descriptor |
|---|---|
| cb_enhancement_flag | u(1) |
| if (cb_enhancement_flag) { | |
|    for ( i=0; i<( (num_coeff_hori_minus1+1)×(num_coeff_verti_minus1+1)−1 ); i++ ) | |
|       cb_filter_coeff[i/(num_coeff_hori_minus1+1)][i%(num_coeff_hori_minus1+1)] | u(16) |
| } | |
| cr_enhancement_flag | u(1) |
| if ( cr_enhancement_flag ) { | |
|    for ( i=0; i<( (num_coeff_hori_minus1+1)×(num_coeff_verti_minus1+1)−1 ); i++ ) | |
|       cr_filter_coeff[i/(num_coeff_hori_minus1+1)][i%(num_coeff_hori_minus1+1)] | u(16) |
| } | |
| } | |
| } | |

One or more symmetric filters may be used (e.g., to reduce the number of filter coefficients to be signaled). For example, when left-right or top-bottom symmetry is used, the number of filter coefficients signaled may be reduced by about one half. When left-right and top-bottom symmetry are used, the number of filter coefficients signaled may be reduced to about one quarter. The one or more symmetric filters may reduce the number of calculations (e.g., by combining filter positions that share the same coefficient values).

An enhancement filter may be applied to a luma component to improve a quality of the luma component. When the enhancement filter (e.g., the luma enhancement filter) is applied to the reconstructed luma signal, an enhancement signal may be produced. The enhancement signal may be added back to the reconstructed luma signal.

Figure 8A:
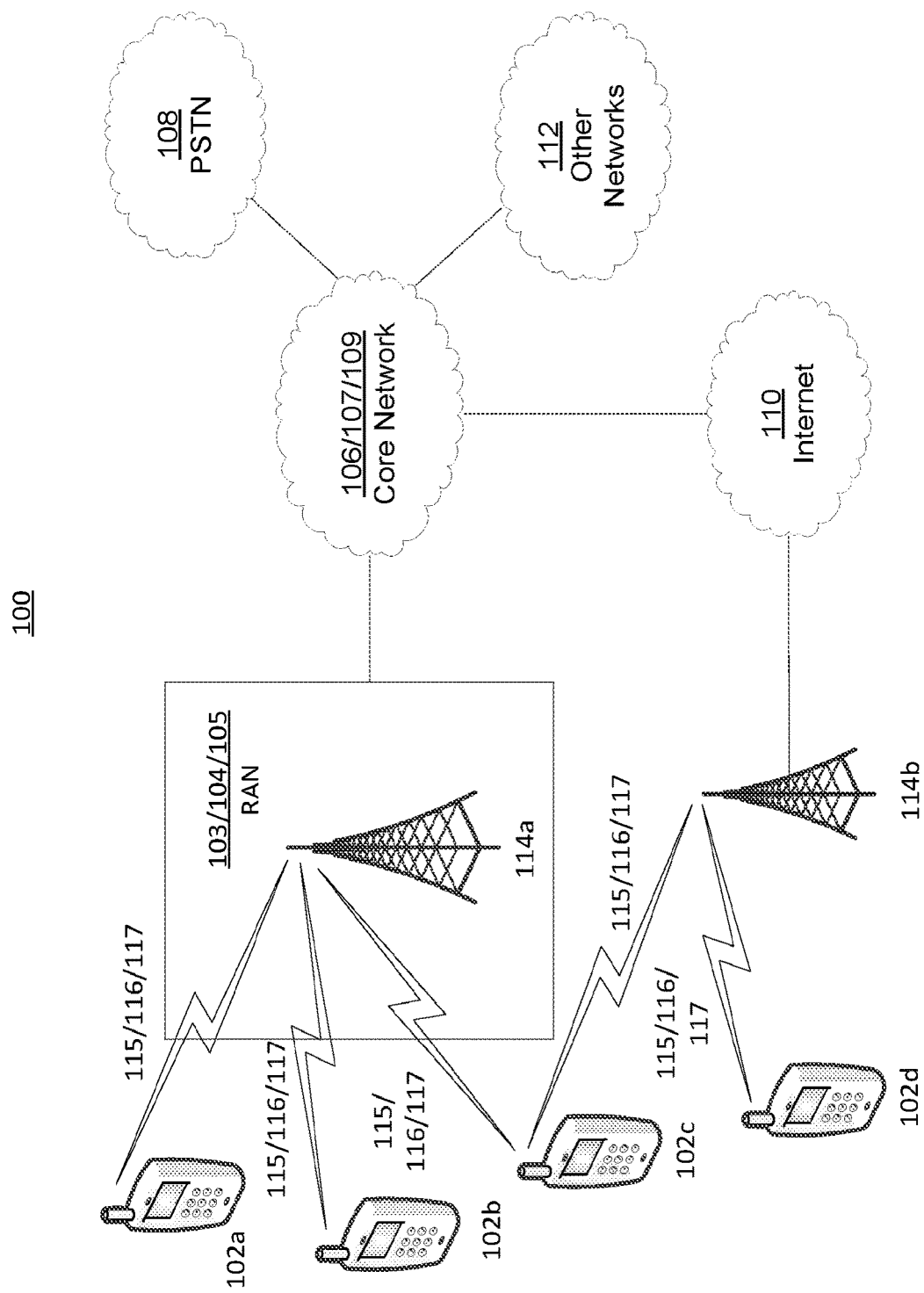
FIG. 8A depicts a system diagram of an example communications system in which one or more disclosed embodiments may be implemented.

FIG. 8A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 8A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the ell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed. Downlink Packet Access (HSDPA) and/or High-Speed Uplink Packet. Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 8A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 8A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over interact protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 8A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e the WTRUs 102a, 102b, 102c, 102d may include multiple transceivers for communicating with different wireless networks over different wireless links. For example, the WTRU 102c shown in FIG. 8A may be configured to communicate with the base station 114a, which may employ a cellular-based radio technology, and with the base station 114b, which may employ an IEEE 802 radio technology.

Figure 8B:
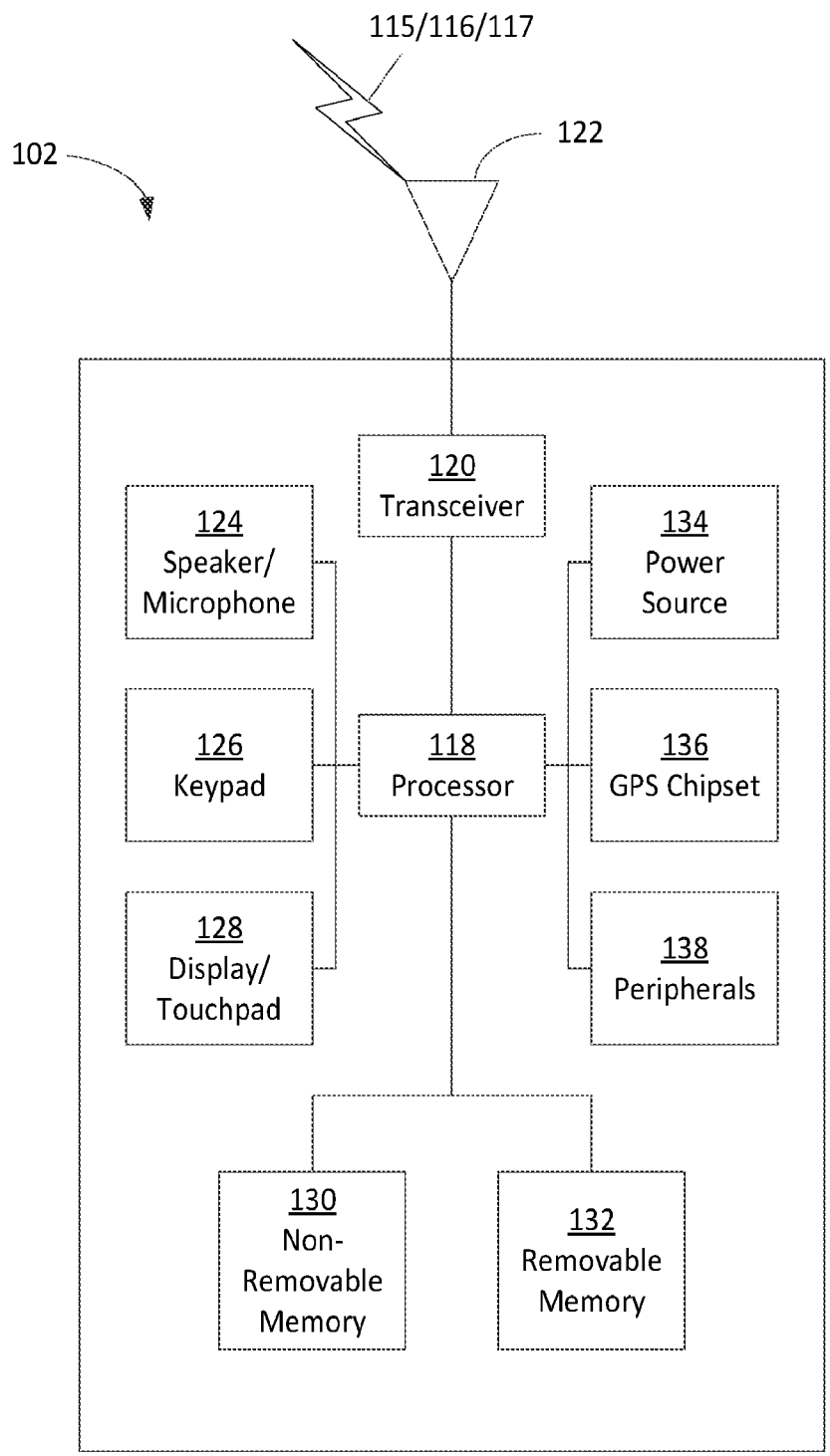
FIG. 8B depicts a system diagram of an example wireless transmit/receive unit (WTRU) that may be used within the communications system depicted in FIG. 8A.

FIG. 8B is a system diagram of an example WTRU 102. As shown in FIG. 8B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 8B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 8B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 8B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the displayltouchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an c-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 8C:
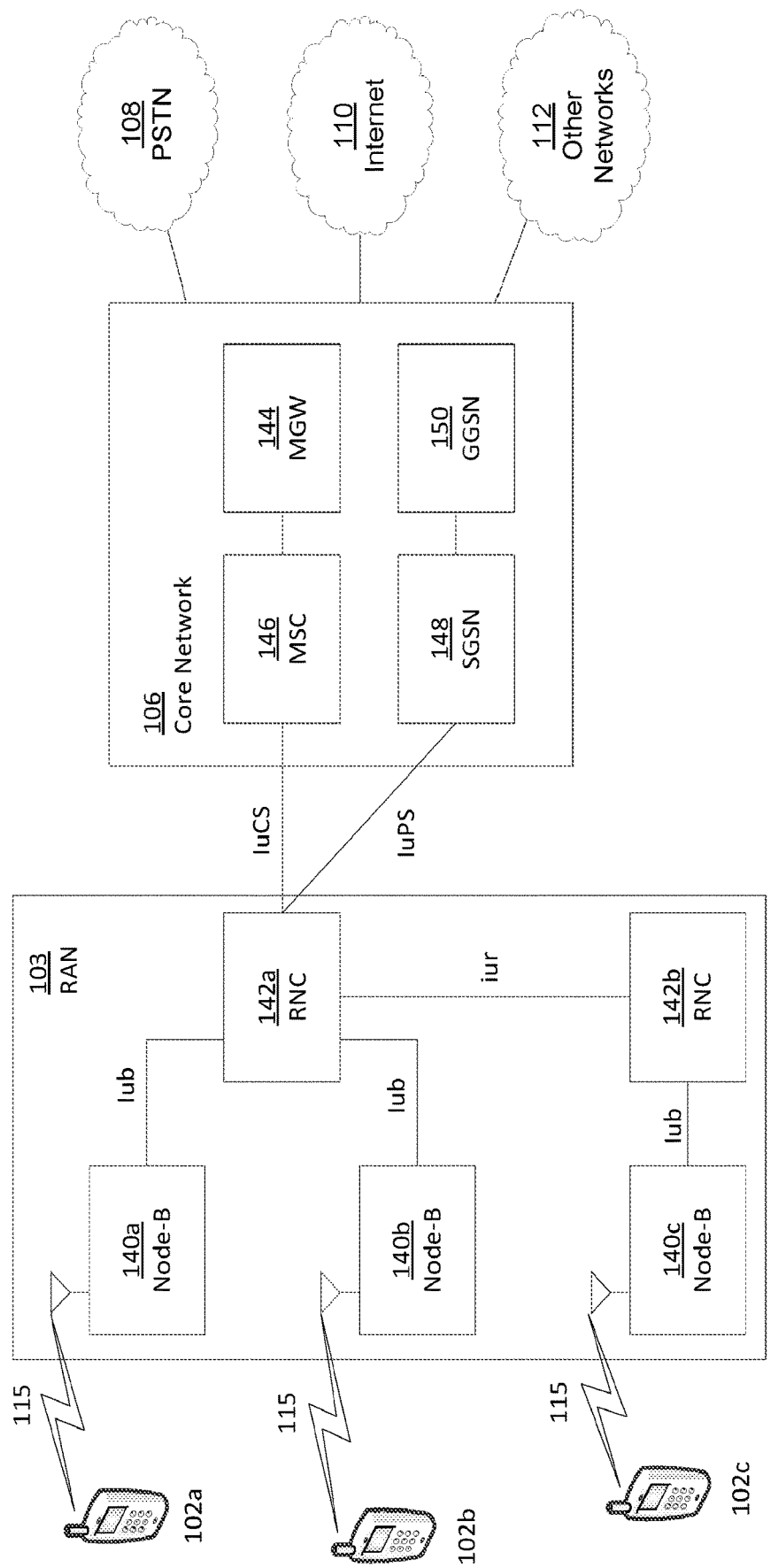
FIG. 8C depicts a system diagram of an example radio access network and an example core network that may be used within the communications system depicted in FIG. 8A.

FIG. 8C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 8C, the RAN 103 may include Node-Bs 140a, 140b, 140c, which may each include one or more transceivers for communicating with the WTRUs 102a, 102b, 102c over the air interface 115.

The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 8C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iux interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 8C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the MTRUs 102a, 102b, 102c and IP-enabled devices.

As noted above, the core network 106 may also be connected to the networks 112, which may include other wired or wireless networks that are owned and/or operated by other service providers.

Figure 8D:
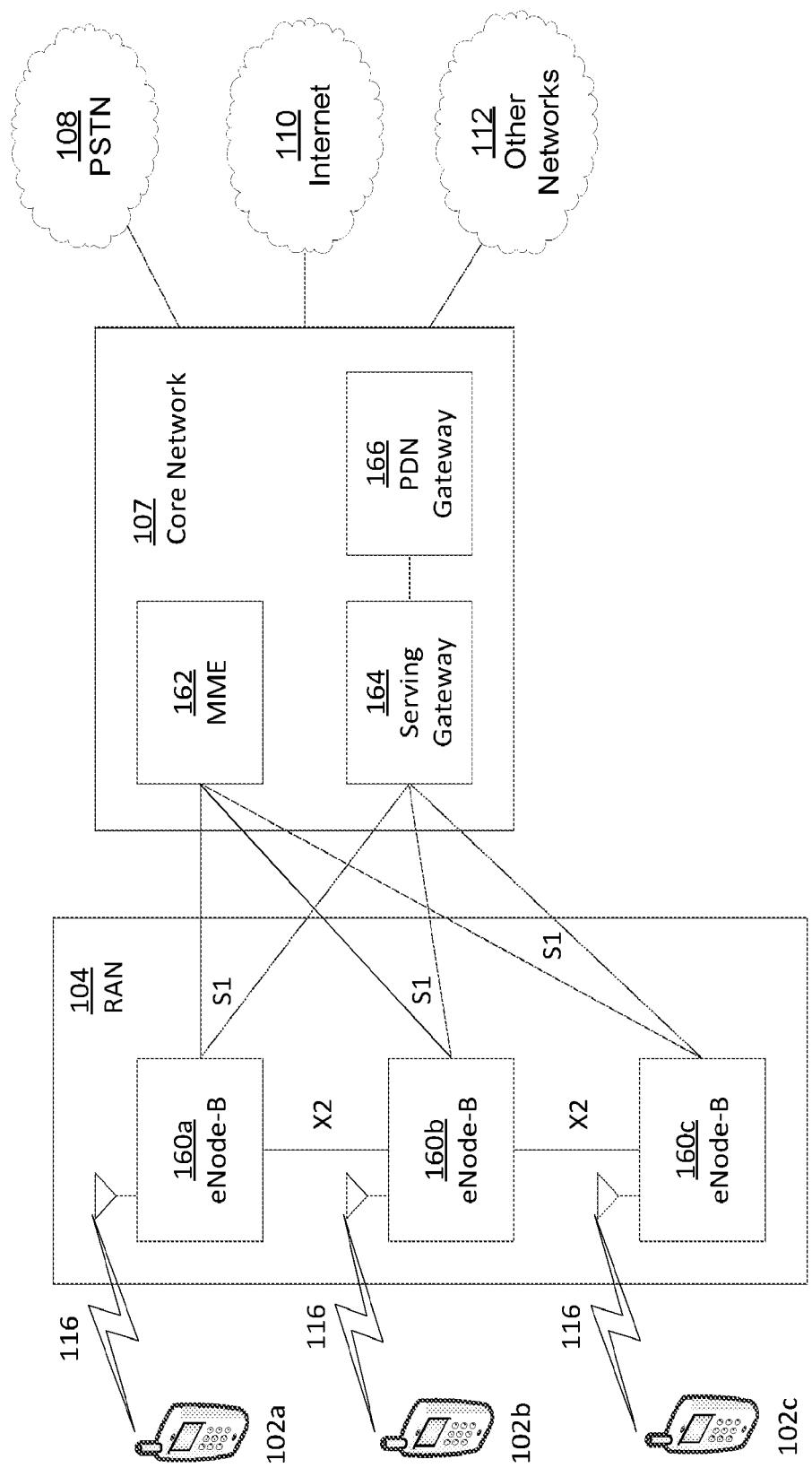
FIG. 8D depicts a system diagram of an example radio access network and an example core network that may be used within the communications system depicted in FIG. 8A.

FIG. 8D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b. 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 8D, the eNode-Bs 160a, 160b, 160c may communicate with one another over an X2 interface.

The core network 107 shown in FIG. 8D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WIRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b), 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 8E:
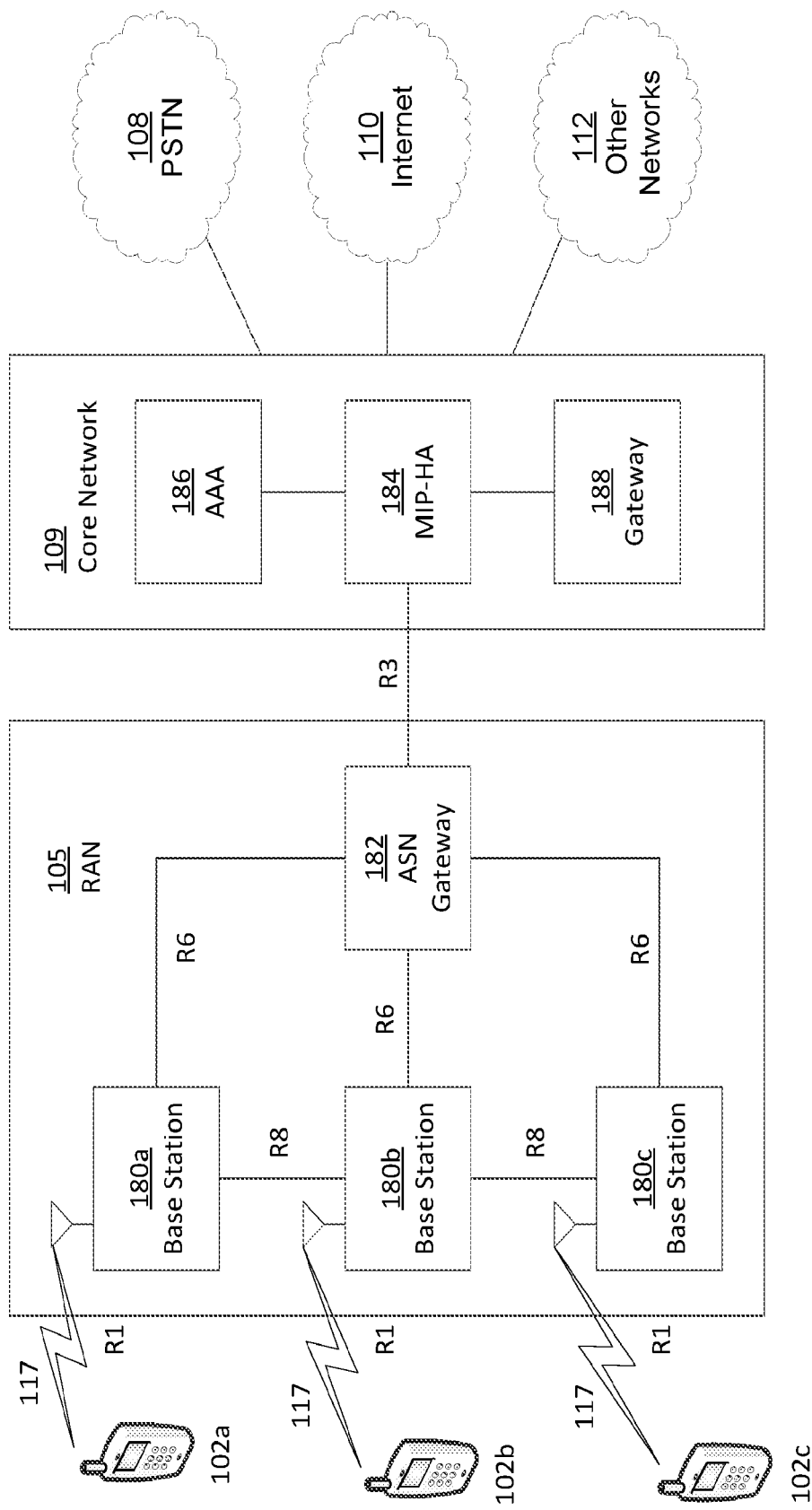
FIG. 8E depicts a system diagram of an example radio access network and an example core network that may be used within the communications system depicted in FIG. 8A.

FIG. 8E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 8E, the RAN 105 may include base stations 180a, 180b. 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 8E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIR-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 8E, it will be appreciated that the RAN 105 may be connected to other ASNs and the core network 109 may be connected to other core networks. The communication link between the RAN 105 the other ASNs may be defined as an R4 reference point, which may include protocols for coordinatimy, the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
   identifying a characteristic within a picture of a video signal, the characteristic comprising a color component;
   determining a sample set that comprises samples in the picture that are associated with the characteristic, the sample set comprising a first sample in a first spatial region and a second sample in a second spatial region of the picture, wherein the first sample and the second sample within the picture have corresponding color component values that are within a predetermined range;
   applying a cross-plane filter to a first luma plane component of the first sample in the first spatial region and a second luma plane component of the second sample in the second spatial region to determine a first offset associated with the first sample and a second offset associated with the second sample, the cross-plane filter comprising a high pass filter;
   adding the first offset to a first reconstructed chroma plane component of the first sample in the first spatial region that corresponds to the first luma plane component; and
   adding the second offset to a second reconstructed chroma plane component of the second sample in the second spatial region that corresponds to the second luma plane component.

2. The method of claim 1, wherein the same cross-plane filter is applied to a respective luma plane component of each sample in the sample set in a plurality of spatial regions that comprises the first and second spatial regions.

3. The method of claim 1, wherein identifying the characteristic is based on a received indication that identifies the characteristic.

4. The method of claim 1, wherein the characteristic comprises an edge direction, the sample set comprising the samples within the picture having a dominant edge direction that matches the edge direction.

5. The method of claim 1, wherein the sample set comprising the samples within the picture that match the color component.

6. The method of claim 1, wherein the characteristic comprises a luminance, the sample set comprising the samples within the picture having a luminance value within a predetermined luminance range.

7. The method of claim 1, wherein a plurality of characteristics is identified within the picture, and wherein the sample set is determined based on the plurality of characteristics.

8. The method of claim 1, further comprising determining to apply the cross-plane filter based on a receipt of one or more cross-plane filter parameters via an SEI message.

9. The method of claim 1, wherein the first luma plane component and the first reconstructed chroma plane component have different spatial dimensions.

10. The method of claim 1, wherein the sample set comprising a third sample in a third spatial region and a fourth sample in a fourth spatial region of the picture, the cross-plane filter comprising a first cross-plane filter, the method further comprising:
    applying a second cross-plane filter to a third luma plane component of the third sample in the third spatial region and a fourth luma plane component of the fourth sample in the fourth spatial region to determine a third offset associated with the third sample and a fourth offset associated with the fourth sample, the cross-plane filter comprising a high pass filter;
    adding the third offset to a third reconstructed chroma plane component of third first sample that corresponds to the third luma plane component; and
    adding the fourth offset to a fourth reconstructed chroma plane component of the fourth sample that corresponds to the fourth luma plane component.

11. A video coding device comprising:
    a processor configured to:
       identify a characteristic within a picture of a video signal, the characteristic comprising a color component;
       determine a sample set that comprises samples in the picture that are associated with the characteristic, the sample set comprising a first sample in a first spatial region and a second sample in a second spatial region of the picture, wherein the first sample and the second sample within the picture have corresponding color component values that are within a predetermined range;
       apply a cross-plane filter to a first luma plane component of the first sample in the first spatial region and a second luma plane component of the second sample in the second spatial region to determine a first offset associated with the first sample and a second offset associated with the second sample, the cross-plane filter comprising a high pass filter;
       add the first offset to a first reconstructed chroma plane component of the first sample in the first spatial region that corresponds to the first luma plane component; and
       add the second offset to a second reconstructed chroma plane component of the second sample in the second spatial region that corresponds to the second luma plane component.

12. The video coding device of claim 11, wherein the processor is configured to apply the same cross-plane filter to a respective luma plane component of each sample in the sample set in a plurality of spatial regions that comprises the first and second spatial regions.

13. The video coding device of claim 11, wherein the characteristic comprises an edge direction, the sample set comprising the samples within the picture having a dominant edge direction that matches the edge direction.

14. The video coding device of claim 11, wherein the processor is configured to identify the characteristic based on a received indication that identifies the characteristic.

15. The video coding device of claim 11, wherein the the sample set comprising the samples within the picture that match the color component.

16. The video coding device of claim 11, wherein the characteristic comprises a luminance, the sample set comprising the samples within the picture having a luminance value within a predetermined luminance range.

17. The video coding device of claim 11, wherein the processor is configured to identify a plurality of characteristics within the picture, and wherein the sample set is determined based on the plurality of characteristics.

18. The video coding device of claim 11, wherein the processor is further configured to determine to apply the cross-plane filter based on a receipt of one or more cross-plane filter parameters via an SEI message.

19. The video coding device of claim 11, wherein the first luma plane component and the first reconstructed chroma plane component have different spatial dimensions.

20. The video coding device of claim 11, wherein the sample set comprising a third sample in a third spatial region and a fourth sample in a fourth spatial region of the picture, the cross-plane filter comprising a first cross-plane filter, wherein the processor is further configured to:

apply a second cross-plane filter to a third luma plane component of the third sample in the third spatial region and a fourth luma plane component of the fourth sample in the fourth spatial region to determine a third offset associated with the third sample and a fourth offset associated with the fourth sample, the cross-plane filter comprising a high pass filter;

add the third offset to a third reconstructed chroma plane component of the third sample that corresponds to the third luma plane component; and add the fourth offset to a fourth reconstructed chroma plane component of the fourth sample that corresponds to the fourth luma plane component.

* * * * *